US010257677B2

(12) United States Patent
Baghel et al.

(10) Patent No.: US 10,257,677 B2
(45) Date of Patent: Apr. 9, 2019

(54) SYSTEM AND METHOD FOR DEVICE-TO-DEVICE COMMUNICATION WITH EVOLVED MACHINE TYPE COMMUNICATION

(71) Applicant: QUALCOMM Incorporated, San Diego, CA (US)

(72) Inventors: Sudhir Kumar Baghel, Bridgewater, NJ (US); Kapil Gulati, Franklin Park, NJ (US); Hong Cheng, Basking Ridge, NJ (US); Shailesh Patil, Raritan, NJ (US); Junyi Li, Chester, NJ (US); Georgios Tsirtsis, London (GB); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 15/253,701

(22) Filed: Aug. 31, 2016

(65) Prior Publication Data
US 2017/0111754 A1 Apr. 20, 2017

Related U.S. Application Data

(60) Provisional application No. 62/242,846, filed on Oct. 16, 2015.

(51) Int. Cl.
*H04W 4/70* (2018.01)
*H04W 48/16* (2009.01)
(Continued)

(52) U.S. Cl.
CPC ............. *H04W 4/70* (2018.02); *H04L 5/0007* (2013.01); *H04L 69/22* (2013.01); *H04W 48/16* (2013.01);
(Continued)

(58) Field of Classification Search
CPC ... H04W 4/005; H04W 48/16; H04W 76/023; H04W 76/046; H04W 12/06;
(Continued)

(56) References Cited

U.S. PATENT DOCUMENTS

2016/0360563 A1* 12/2016 Lecroart ............. H04W 76/022
2017/0317740 A1* 11/2017 Basu Mallick .... H04B 7/15557

FOREIGN PATENT DOCUMENTS

| EP | 2773129 A1 | 9/2014 |
| GB | 2522937 A | 8/2015 |
| WO | 2011077066 A1 | 6/2011 |

OTHER PUBLICATIONS

3GPP TR 23.703: "3rd Generation Partnership Project, Technical Specification Group Services and System Aspects, Study on Architecture Enhancements to Support Proximity-Based Services (ProSe) (Release 12)", 3rd Generation Partnership Project (3GPP), Mobile Competence Centre, 650, Route Des Lucioles, F-06921 Sophia-Antipolis Cedex, France, vol. SA WG2. No. V12.0.0, Mar. 10, 2014 (Mar. 10, 2014), pp. 1-324, XP002758292, paragraph [4.1.3] p. 170, paragraph 6.3—p. 213 paragraph [annexK].
(Continued)

*Primary Examiner* — Jae Y Lee
(74) *Attorney, Agent, or Firm* — Arent Fox LLP

(57) ABSTRACT

A method, an apparatus, and a computer-readable medium for wireless communication are provided. In an exemplary embodiment, the apparatus can receive a packet at a Uu protocol stack of a first user equipment (UE), the packet intended for a base station. In addition, the apparatus can transfer the packet from the Uu protocol stack of the first UE to a PC5 interface protocol stack of the first UE. Furthermore, the apparatus can modify a header of the packet at the PC5 interface protocol stack to identify the packet as relayed uplink traffic intended for the base station from the first UE. Moreover, the apparatus can transmit the packet including the modified header to a second UE for relaying to the base station.

22 Claims, 25 Drawing Sheets

(51) Int. Cl.
*H04L 29/06* (2006.01)
*H04L 5/00* (2006.01)
*H04W 76/14* (2018.01)
*H04W 76/27* (2018.01)
*H04W 12/06* (2009.01)
*H04W 84/04* (2009.01)
*H04W 88/04* (2009.01)

(52) U.S. Cl.
CPC ........... *H04W 76/14* (2018.02); *H04W 76/27* (2018.02); *H04W 12/06* (2013.01); *H04W 84/047* (2013.01); *H04W 88/04* (2013.01)

(58) Field of Classification Search
CPC .. H04W 84/047; H04W 88/04; H04L 5/0007; H04L 69/22
See application file for complete search history.

(56) References Cited

OTHER PUBLICATIONS

3GPP TS 23.303, "3rd Generation Partnership Project; Technical Specification Group Services and System Aspects; Proximity-based services (ProSe); Stage 2 (Release 13)", 3GPP Standard; 3GPP TS 23.303, 3rd Generation Partnership Project (3GPP), Mobile Competence Centre ; 650, Route Des Lucioles ; F-06921 Sophia-Antipolis Cedex; France, vol. SA WG2, No. V13.1.1, Sep. 30, 2015 (Sep. 30, 2015), XP050996404, pp. 1-116, [retrieved on Sep. 30, 2015].
International Search Report and Written Opinion—PCT/US2016/049991—ISA/EPO—dated Dec. 1, 2016.

\* cited by examiner

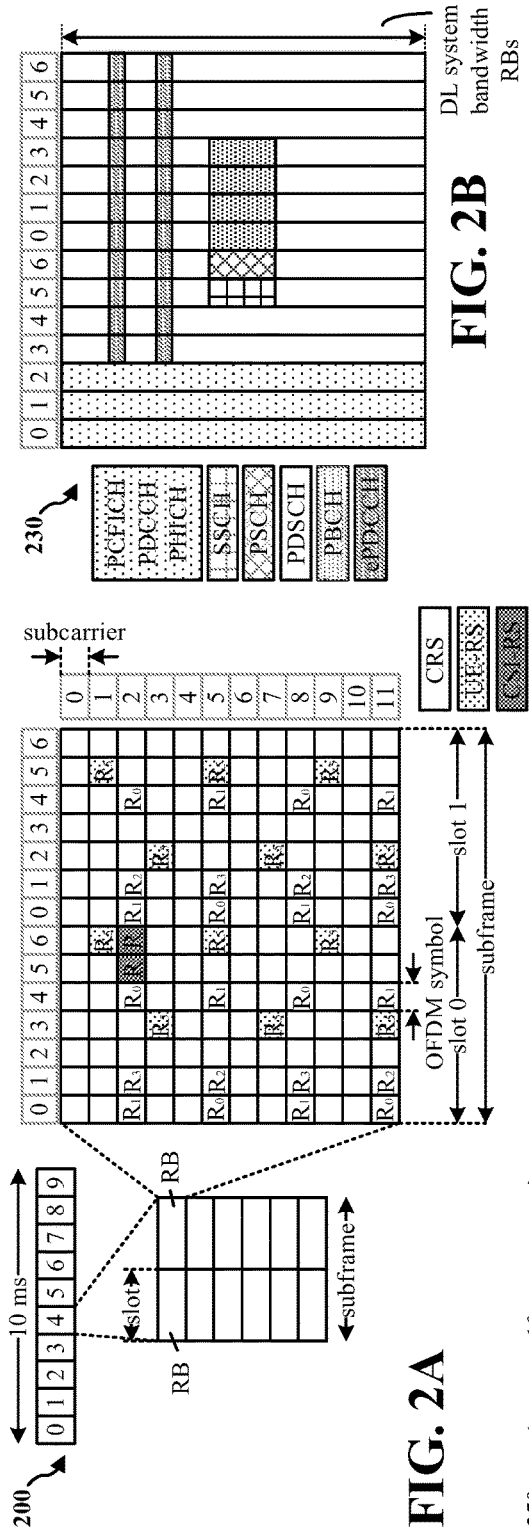
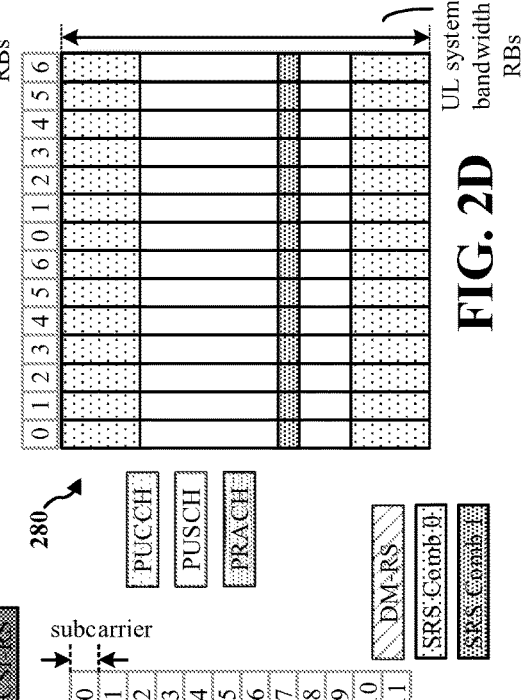
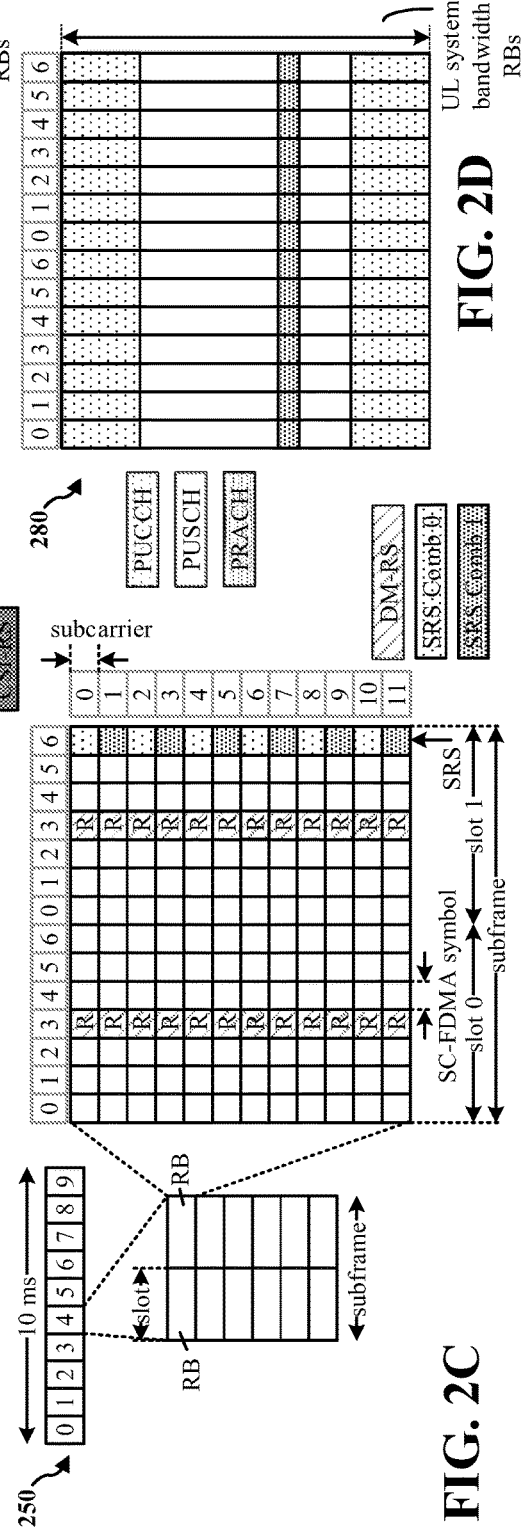
FIG. 2A    FIG. 2B    FIG. 2C    FIG. 2D

SYSTEM AND METHOD FOR DEVICE-TO-DEVICE COMMUNICATION WITH EVOLVED MACHINE TYPE COMMUNICATION

CROSS-REFERENCE TO RELATED APPLICATION(S)

This application claims the benefit of U.S. Provisional Application Ser. No. 62/242,846 entitled "Device-to-Device Based Mechanism for Evolved Machine Type Communication" and filed on Oct. 16, 2015, which is expressly incorporated by reference herein in its entirety.

BACKGROUND

Field

The present disclosure relates generally to communication systems, and more particularly, to a device-to-device (D2D) mechanism for evolved machine type communication (eMTC).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In an exemplary embodiment, the apparatus can receive a packet at a Uu protocol stack of a first user equipment (UE), the packet intended for a base station. In addition, the apparatus can transfer the packet from the Uu protocol stack of the first UE to a PC5 interface protocol stack of the first UE. Furthermore, the apparatus can modify a header of the packet at the PC5 interface protocol stack to identify the packet as relayed uplink traffic intended for the base station from the first UE. Moreover, the apparatus can transmit the packet including the modified header to a second UE for relaying to the base station.

In another exemplary embodiment, the apparatus can receive a first packet at a PC5 interface protocol stack of a first user equipment (UE) from a second UE, the first packet including a header that identifies the packet as relayed uplink traffic intended for a base station from the second UE. In addition, the apparatus can a second packet at a Uu protocol stack of the first UE, the second packet intended for the base station from the first UE. Furthermore, the apparatus can transfer the first packet from the PC5 interface protocol stack of the first UE to the Uu protocol stack of the first UE. Moreover, the apparatus can combine the first packet and the second packet to produce a combined packet. Additionally, the apparatus can modify a header of the combined packet at the Uu protocol stack to identify the first packet as relayed uplink traffic from the second UE and the second packet local data from the first UE. Still further, the apparatus can transfer the combined packet including the modified header to the base station.

In a further exemplary embodiment, the apparatus can receive a data transmission from a first UE, the data transmission including a combined packet that includes a first packet associated with the first UE, a second packet from a second UE, a first index of a layer 2 identification (L2-ID) table associated with the first UE, and a second index of a system architecture evolution (SAE) temporary mobile subscriber identity (S-TMSI) table associated with the second UE. Further, the apparatus can decode the first packet using the first index of the L2-ID table for cell ratio temporary identifier (C-RNTI) mapping. Additionally, the apparatus can decode the second packet using the second index of the S-TMSI table for C-RNTI mapping.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
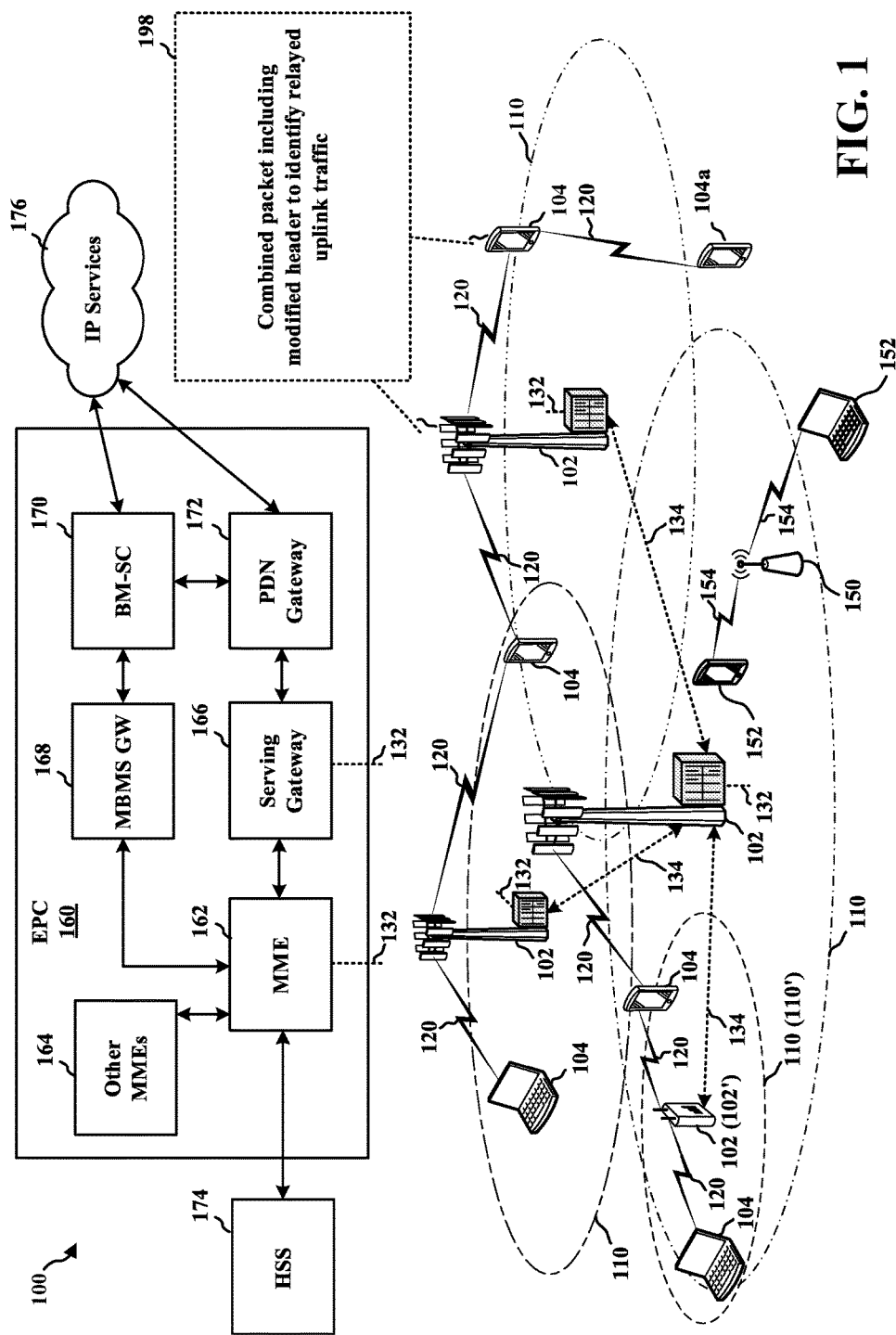
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first UE 104a may be configured to receive a packet at a Uu protocol structure of the first UE 104a. The first UE 104a may be configured to transfer the packet from the Uu protocol stack of the first UE 104a to a PC5 interface protocol stack of the first UE 104a. The first UE 104a may be configured to modify a header of that packet at the PC5 interface protocol stack to identify the packet a relayed uplink traffic intended for a base station 102 from the first UE 104a. The first UE 104a may be configured to transmit the packet to a second UE 104 for relaying to the base station 102, for example, using a communication 120 (which may be a device-to-device communication link, in some aspects).

The second UE 104 may be configured to receive the packet from the first UE 104a at a PC5 interface protocol stack of the second UE 104. The second UE 104 may be further configured to receive a second packet at a Uu protocol stack of the second UE 104. The second UE 104 may combine the packet from the first UE 104a and the second packet (received at the Uu protocol stack of the second UE 104) to produce a combined packet. The second UE 104 may modify a header of the combined packet to identify the first packet a relayed uplink traffic from the first UE 104a and the second packet as local data from the second UE 104. The second UE 104 may then transmit the combined packet 198, including the modified header, to the base station 102.

The base station 102 may be configured to receive the combined packet 198 from the second UE 104. The combined packet 198 may include the first packet associated with the first UE 104a, the second packet from the second UE 104, a first index of a layer 2 identification (L2-ID) table associated with the first UE 104a, and a second index of a system architecture evolution (SAE) temporary mobile subscriber identity (S-TMSI) table associated with the second UE 104. The base station 102 may decode the first packet of the combined packet 198 using the first index of the L2-ID table for cell radio temporary identifier (C-RNTI) mapping). The base station 102 may be further configured to decode the second packet using the second index of the S-TMSI table for C-RNTI mapping.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
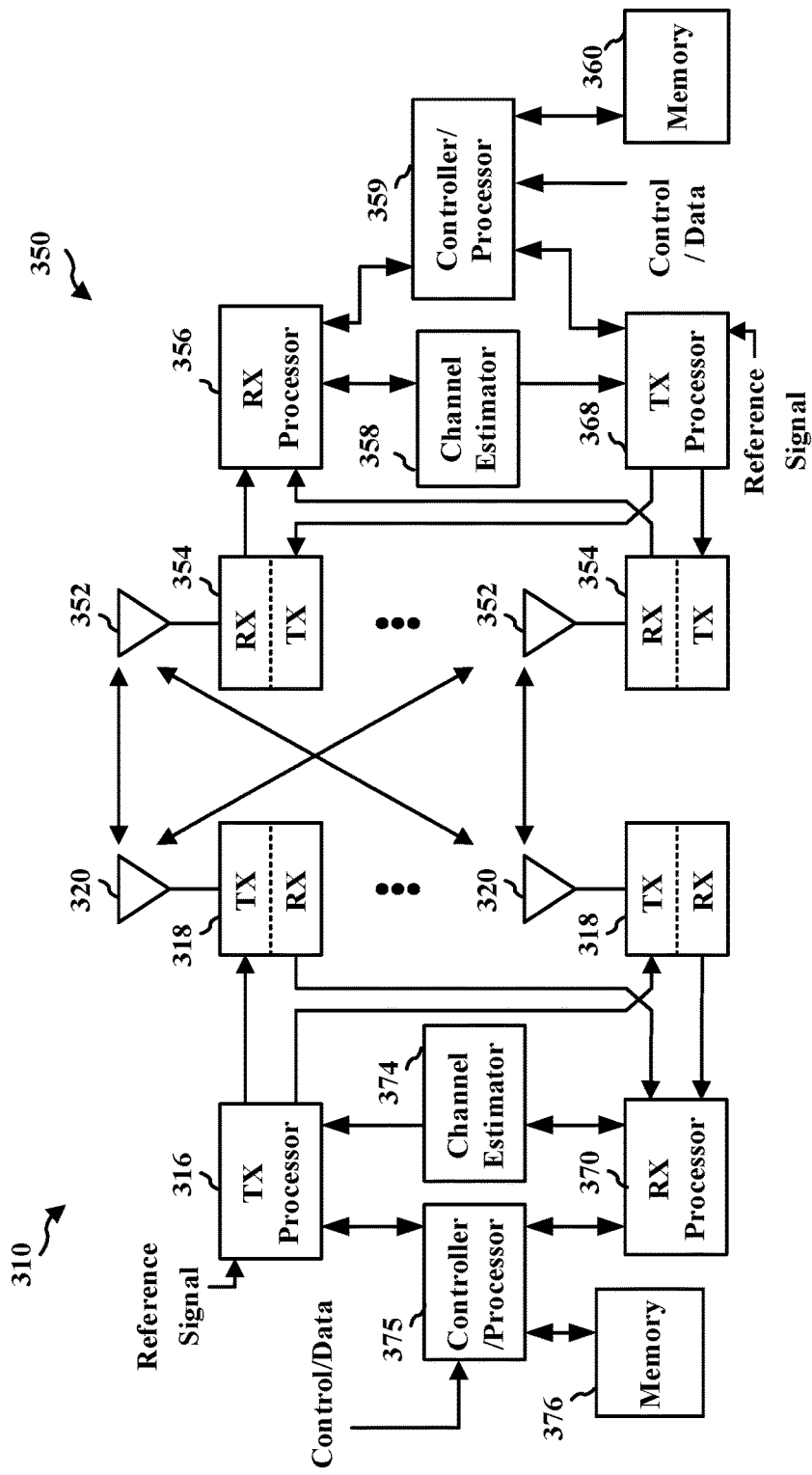
FIG. 3 is a block diagram of a wireless communications system.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
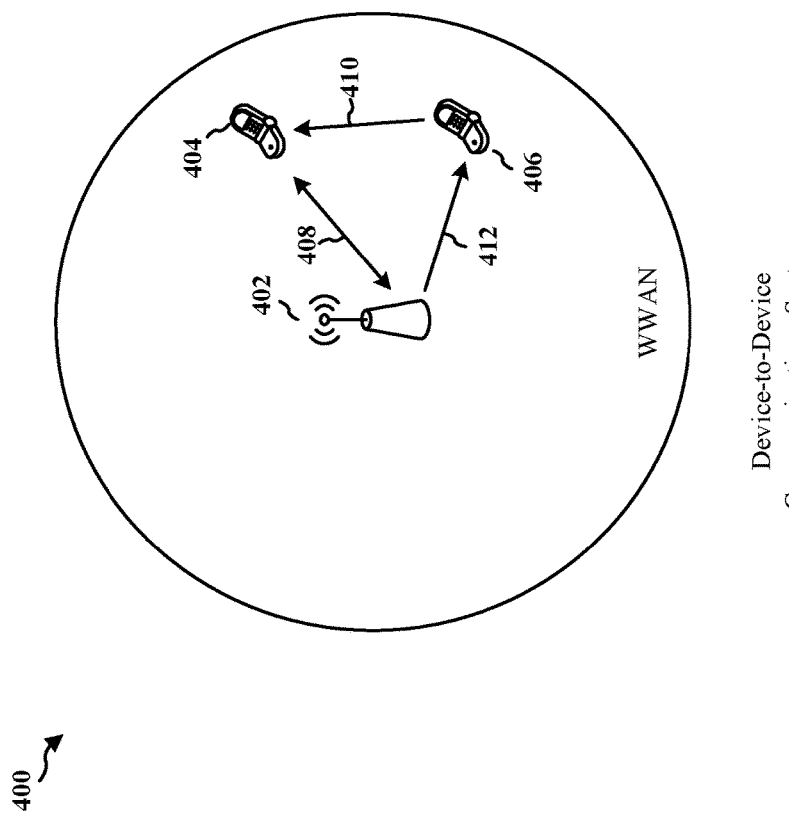
FIG. 4 is a diagram of a device-to-device communications system.

FIG. 4 is a diagram of a device-to-device communications system 400. The device-to-device communications system 400 includes a plurality of UEs 404 and 406. The device-to-device communications system 400 may overlap with a cellular communications system, such as for example, a wireless wide area network (WWAN). The UEs 404 and 406 may communicate together in device-to-device communication using the DL/UL WWAN spectrum, some may communicate with the eNB 402, and some may do both. For example, as shown in FIG. 4, the UE 406 is in cellular communication 410 with the eNB 402. The eNB 402 is also transmitting downlink communications 412 to the UE 406. For example, the UE 406 may be a remote evolved machine type communication (eMTC) UE that is configured for D2D transmissions 410 to the relay UE 804 and for reception of downlink (DL) transmissions 412 from the eNB 402. In an exemplary embodiment, the remote eMTC UE 406 may not be configured for D2D receptions from the relay UE 404 or for UL transmissions to the eNB 402. In this way, the remote eMTC UE 406 may provide UL coverage enhancement at improved power efficiency, while still maintaining a low-cost advantage. In addition, the UE 404 is in cellular communication 408 both receiving and transmitting communications 408 with the eNB 402.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5A:
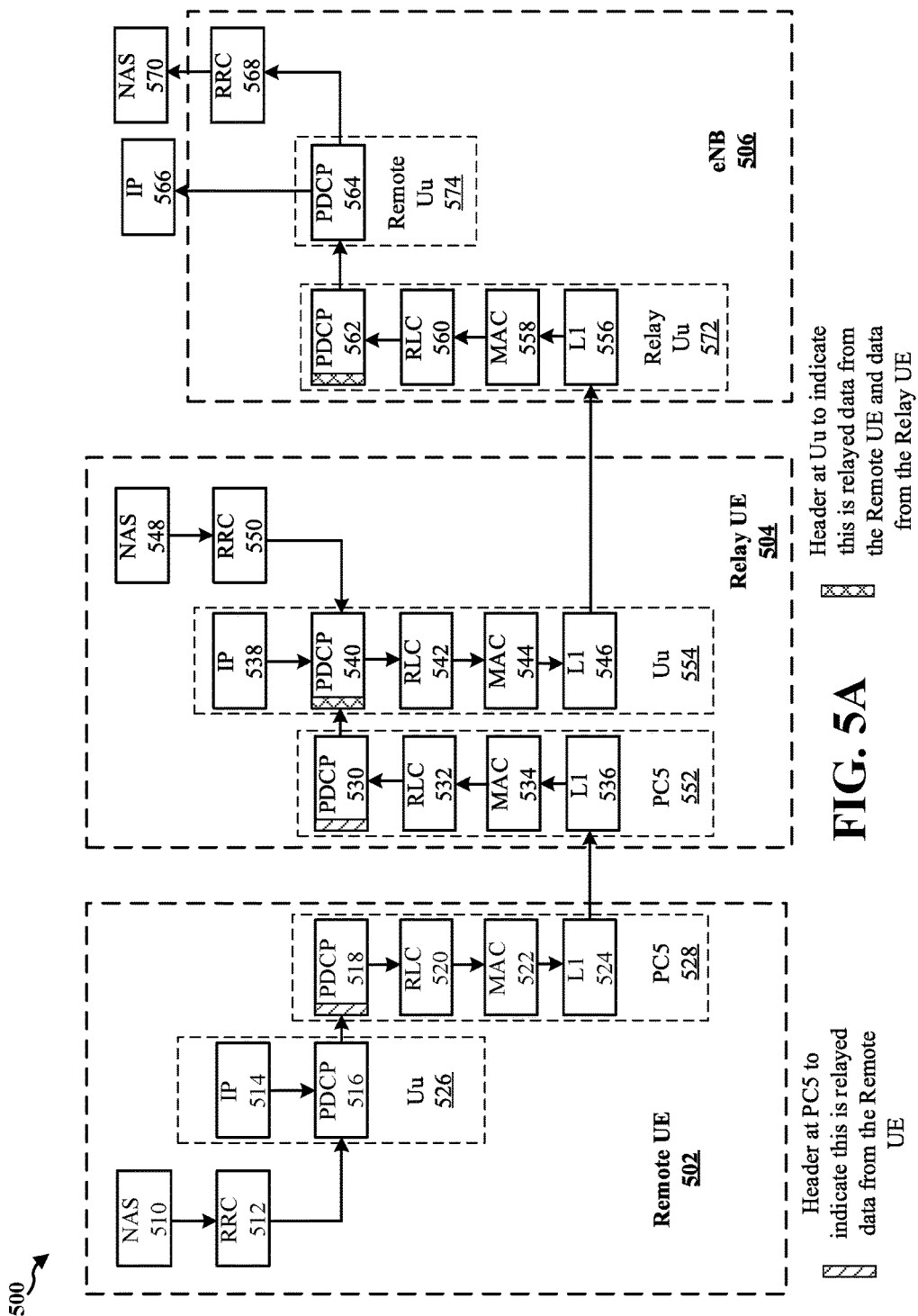
FIGS. 5A-5C are a diagram of a device-to-device communications system.
Figure 5B:
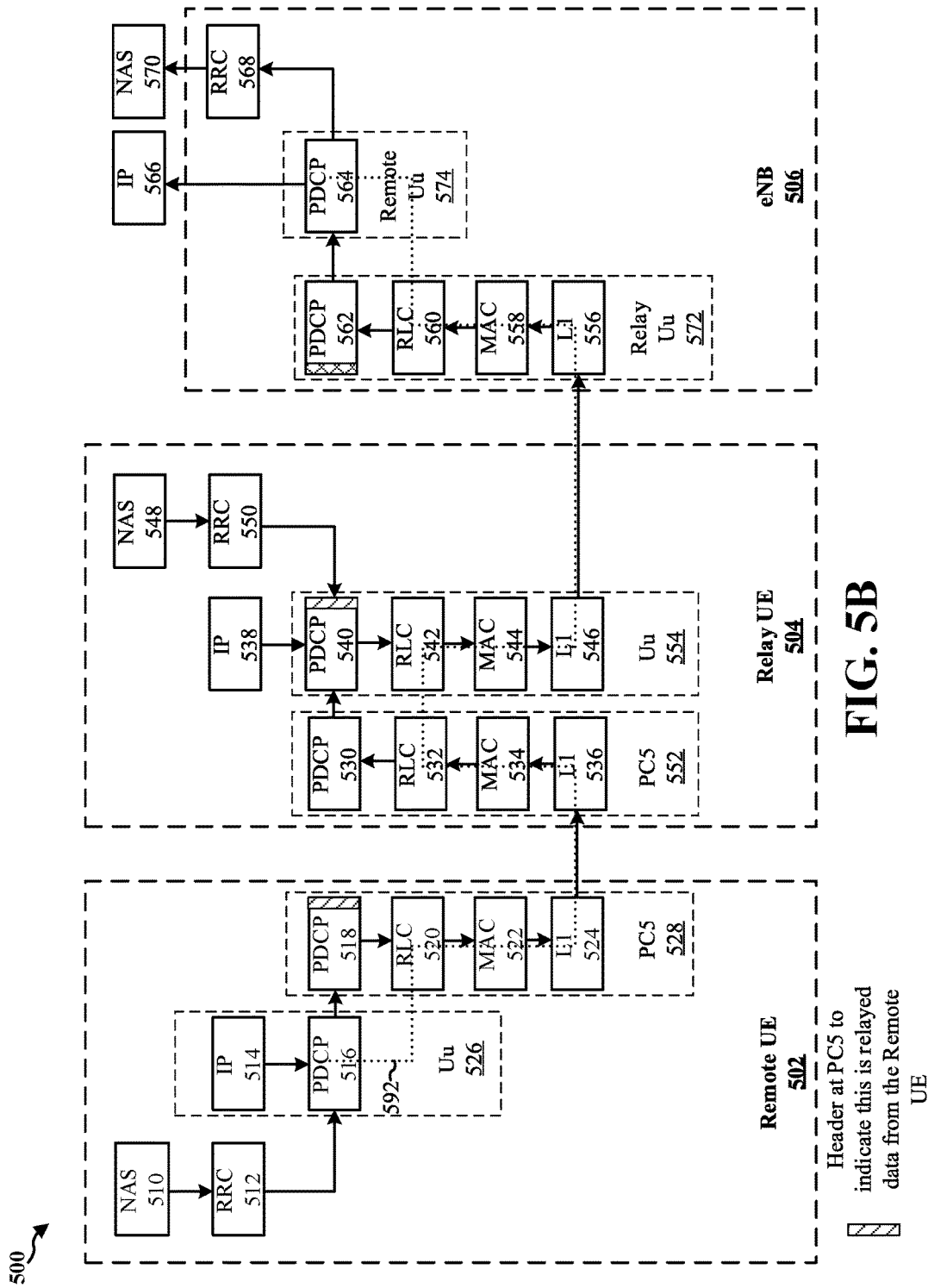

FIGS. 5A and 5B are a diagram of a D2D communications system 500. For example, the communications system 500 may include an uplink (UL) protocol stack for relaying UL transmissions from the PC5 interface protocol stack of remote UE 502 to the eNB 506 via the relay UE 504. In an aspect, the remote UE 502 may be an evolved machine-type communication (eMTC) UE.

Referring to FIGS. 5A and 5B, the remote UE 502 and the relay UE 504 may each include a non-access stratum (NAS) sublayer 510, 548 that provides an interface between the core network and each of the remote UE 502 and the relay UE 504, respectively. The NAS sublayer 510, 548 may be used to manage the establishment of communication sessions and for maintaining continuous communications with the EPC and the remote UE 502 and the relay UE 504 when the remote UE 502 and/or the relay UE 504 move. Additionally, the remote UE 502 and the relay UE 504 may each include an RRC sublayer 512, 550 that is responsible for obtaining radio resources (e.g., radio bearers) and for configuring the lower layers using RRC signaling between the eNB 506 and each of the remote UE 502 and the relay UE 504.

Moreover, the remote UE 502 and the relay UE 504 may each include a user plane protocol stack (Uu) 526, 554 that provides an air interface to the eNB 506. For example, the Uu 526 in the remote UE 502 may include an IP sublayer 514 and a PDCP sublayer 516. The Uu 554 in the relay UE 504 may include an IP sublayer 538, a PDCP sublayer 540, an RLC sublayer 542, a MAC sublayer 544, and an L1 layer 546. The IP layers 514, 538 may provide access to one or more of the Internet, an intranet, an IMS, a PSS, and/or other IP services. Descriptions for the PDCP sublayers, the RLC sublayers, the MAC sublayers, and the L1 layers may be found above with respect to FIG. 5.

Still referring to FIGS. 5A and 5B, the remote UE 502 and the relay UE 504 may each include a PC5 interface protocol stack 528, 552 for D2D communications between the remote UE 502 and the relay UE 504. Each PC5 stack 528, 552 includes a PDCP sublayer 518, 530, an RLC sublayer 520, 532, a MAC sublayer 522, 534, and an L1 layer 524, 536.

The eNB 506 may include a NAS sublayer 570 that provides an interface between the core network and the eNB 506. Additionally, the eNB 506 may include an RRC sublayer 568 that is responsible for obtaining radio resources (e.g., radio bearers) and for configuring the lower layers using RRC signaling between the eNB 506 and each of the remote UE 502 and the relay UE 504.

Furthermore, the eNB 506 may include a relay Uu 572 that provides an air interface between the relay UE 504. In addition, the eNB 506 may include a remote Uu 574 that provides an air interface between the remote UE 502. For example, the remote Uu 574 may include a PDCP sublayer 564 in communication with an IP sublayer 566. The relay Uu 556 may include a PDCP sublayer 562, an RLC sublayer 560, a MAC sublayer 558, and an L1 layer 556. The IP layers 514, 538 may provide access to one or more of the Internet, an intranet, an IMS, a PSS, and/or other IP services.

Referring now to FIG. 5A, a first packet may be received at the Uu 526 by the remote UE 502. The first packet may be intended for the eNB 506. However, since the remote UE 502 may not be configured for UL transmissions with the eNB 506, the remote UE 502 may relay the first packet to eNB 506 via relay UE 504. The relay UE 504 may transmit the first packet relayed from the remote UE 502 to the eNB 506. The PDCP sublayer 516 in Uu 526 may transfer the first packet to the PDCP sublayer 518 in PC5 stack 528. The PDCP sublayer 518 may modify a header of the first packet to identify the first packet as relayed uplink traffic intended for the base station from the remote UE 502. For example, the header can be modified to include a system architecture evolution (SAE) temporary mobile subscriber identity (S-TMSI) that the eNB 506 may use in identifying the first packet as originating from remote UE 502. In addition, the modified header may include PC5 PDCP header (e.g., 1 byte), information indicating that first packet is relayed UL link traffic (e.g., 1 bit), and information that indicates the "heartbeat" for DL traffic (e.g., indicating that remote UE 502 can receive DL transmissions from the eNB 506). The first packet including the modified header may be transferred down to L1 524 in PC5 stack 528. The first packet may then be transmitted via L1 524 to the relay UE 504. In an aspect, the first packet may be received at L1 536 of PC5 stack 552 in the relay UE 504.

Still referring to FIG. 5A, the first packet may then be passed up through the sublayers of PC5 stack 552. The PDCP sublayer 530 may transfer the first packet to the PDCP sublayer 540 in Uu 554. Moreover, a second packet may be received at PDCP sublayer 540. For example, the second packet may be local data originating from the relay UE 504 and intended for eNB 506. The PDCP sublayer 540 may combine the first packet and the second packet since both are intended for eNB 506. The PDCP sublayer 540 may modify the header of the combined packet to identify the first packet as relayed uplink traffic from the remote UE 502 and the second packet local data from the relay UE 504. For example, the modified header of the combined packet may include an index of a layer 2 identification (L2-ID) table associated with the relay UE 504 and an index of a S-TMSI/IMSI table associated with the remote UE 502 (e.g., a ProSe L2-ID table to indicate the ProSe L2-ID of the source remote UE 502). The combined packet may be passed down through the sublayers in the Uu 554. In addition, the modified header of the combined packet may include information (e.g., 1 bit) that indicates the first packet is being relayed from remote UE 502. The combined packet including the modified header may be transmitted via L1 layer 546 to the eNB 506.

Referring again to FIG. 5A, the combined packet may be received at the relay Uu 572 of the eNB 506. In an aspect, the combined packet may be received at the L1 layer 556 of the relay Uu 572 and then passed up to the PDCP sublayer 562 where the modified header of the combined packet may be removed and/or decoded. The eNB 506 may decode the first packet using the index of the S-TMSI/IMSI table in the modified header for C-RNTI mapping. Additionally, the eNB 506 may decode the second packet using the index of the L2-ID table in the modified header for C-RNTI mapping. For example, the eNB 506 may use the index of the S-TMSI/IMSI to determine the S-TMSI/IMSI for C-RNTI mapping and route the first packet to the remote Uu 574. Alternatively, the eNB 506 may use the index of the ProSe L2-ID for C-RNTI mapping for the relay UE 504. In an aspect, the ProSe L2-ID/associated index and the S-TMSI/IMSI/associated index may be provided to the eNB 506 by the relay UE 504 in a SidelinkUEinformation message.

FIG. 5B is a diagram of a D2D communications system 500 that includes the same protocol stacks for RLC described above with respect to FIG. 5A but with reduced overhead. In an aspect, the RLC may operate in unacknowledged mode (UM). As illustrated in FIG. 5B, the protocol stack between the Uu 554 at the relay UE 504 and relay Uu 572 at the eNB 506 is unchanged. This includes some redundancy, e.g., additional security of the link between the relay UE 504 and the eNB 506 may not be required since the data is secured by the PDCP sublayer 518 at the remote UE 502. Here, the first packet may be relayed to the eNB 506 via the relay UE 504, but via different layers of the protocol stacks. For example, the first packet may be passed through the RLC layer 560 at the eNB 506 to the PDCP sublayer 564 for the remote Uu 574. In an aspect, the first packet may follow communication path 592 from Uu PDCP sublayer 516 to PC5 RLC 520, and at the relay UE 504, the first packet may follow communication path 592 from PC5 RLC 532 to Uu RLC 542.

Figure 5C:
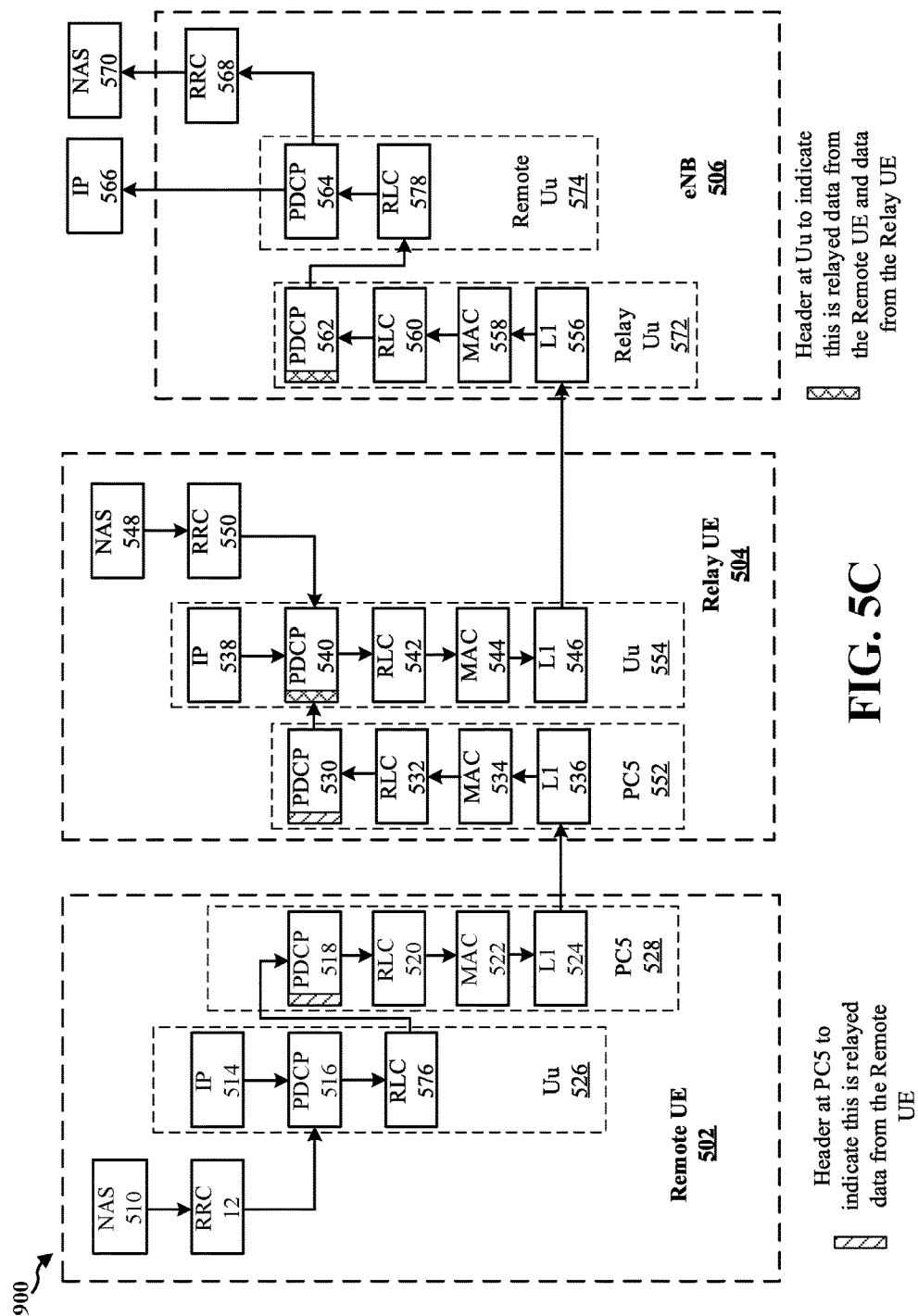

FIG. 5C is a diagram of D2D communications 500 that includes protocol stacks for RLC acknowledgement mode (AM). FIG. 5C discloses similar protocol stacks as described above with respect to FIGS. 5A and 5B except that the first packet received in the Uu 526 of the remote UE 502 is transferred to the PC5 528 via RLC sublayer 576. In addition, the PDCP sublayer 562 in relay Uu 572 transfers the first packet to RLC sublayer 578 in remote Uu 574 at the eNB 506. An RLC AM entity on the Uu is instantiated, resembling normal Uu operation between a UE and an eNB (e.g., direct UL and DL communications between a UE and eNB). As illustrated in FIG. 5C, the segmentation can be done based on the PC5 link (e.g., hence the coupling between PC5 MAC sublayer 522 and Uu RLC sublayer 576 at the remote UE 502). As compared with RLC UM, RLC AM can provided reliability/feedback for UL transmissions. Having RLC AM may also be helpful in reusing the legacy procedure for radio link failure (RLF) when the remote UE 502 is out of coverage (RLC transmission timer timeout).

Figure 6:
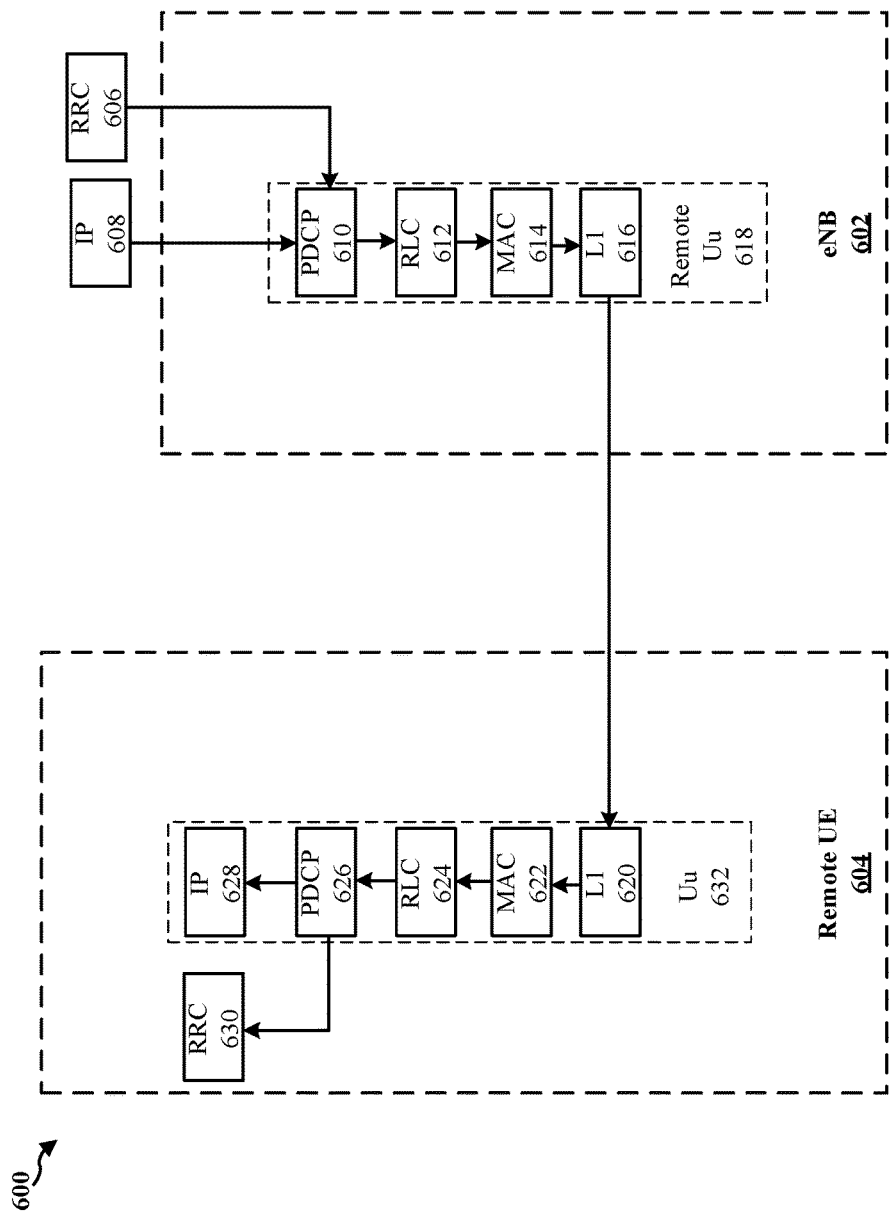
FIG. 6 is a diagram of a device-to-device communications system.

FIG. 6 illustrates a downlink protocol stack between a remote UE 604 and an eNB 602.

As illustrated in FIG. 6, the eNB includes a remote Uu 618 that includes a PDCP sublayer 610, an RLC sublayer 612, a MAC sublayer 614, and a L1 layer 616. The remote Uu 618 may be in communication with an RRC sublayer 606 and an IP sublayer 608. A packet may be transmitting on the downlink by passing the packet from the PDCP sublayer 610 down the remote Uu 618 to L1 616. The packet may be transmitted to the remote UE 604 via L1 616 to L1 620 in the Uu 632 at the remote UE 604. The Uu 632 at the remote UE 604 may include L1 layer 620, MAC sublayer 622, RLC sublayer 624, PDCP sublayer 626, and IP sublayer 628. The PDCP sublayer 626 may be in communication with RRC sublayer 630 at the remote UE 604. Descriptions for each of the sublayers are described above with respect to FIGS. 3 and 5A-5C.

Figure 7:
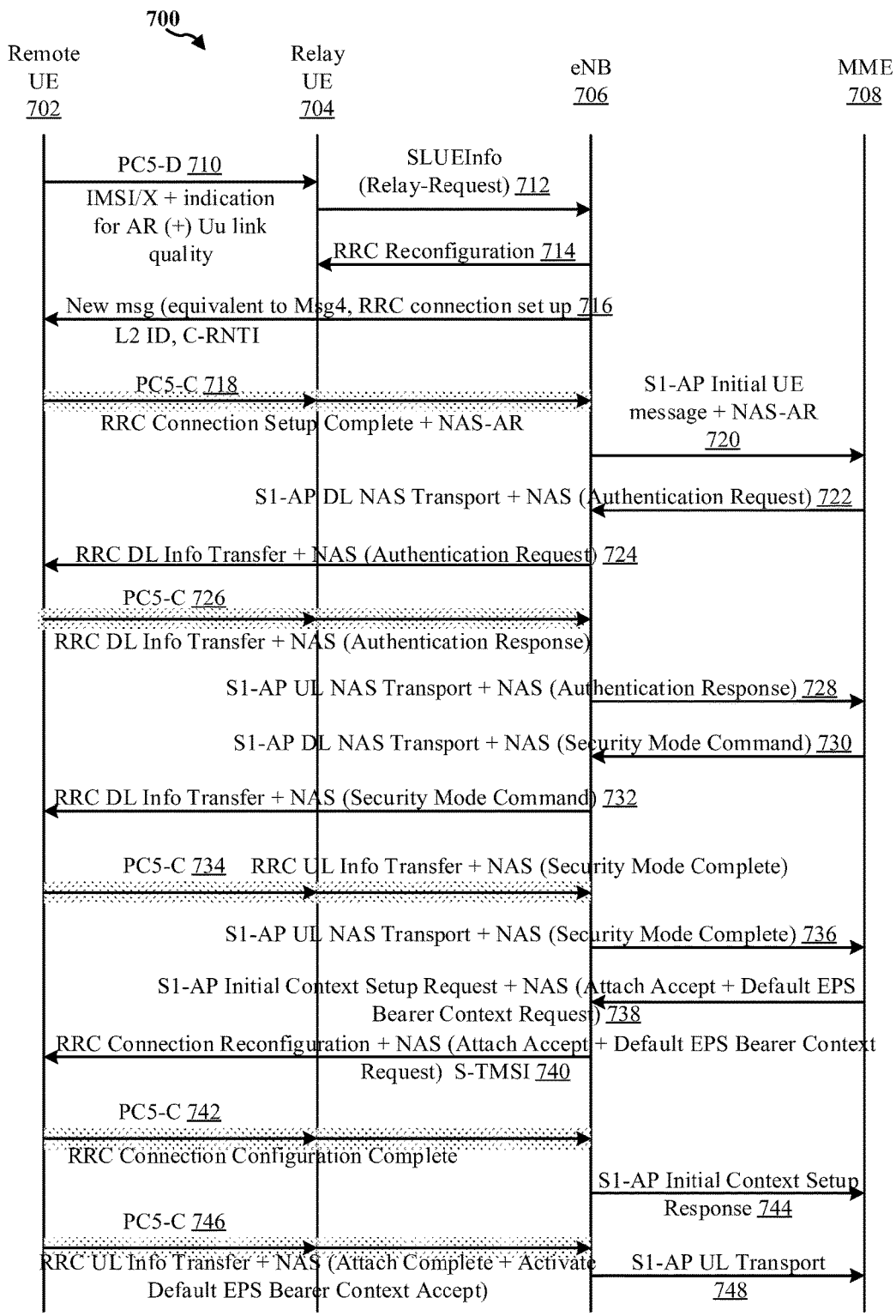
FIG. 7 is a flow diagram of a device-to-device communications system.

FIG. 7 illustrates a flow diagram 700 for an initial attach procedure of the remote UE 702 to an eNB 706 via a relay UE 704. The shaded arrows in FIG. 7 illustrate a message being relayed (e.g., tunneled) from the remote UE 702 to the eNB 706 via the relay UE 704.

As illustrated in FIG. 7, remote UE 702 can send a discovery message (PC5-D) 710 to the relay UE 704. In an aspect, the PC5-D 710 can include an IMSI associated with the remote UE 702, a number "X" that distinguishes the remote UE 702 from other UEs communicating with the eNB 706 via the relay UE 704, an attach request, and/or Uu link quality. The relay UE 704 can send a relay request 712 to the eNB 706. The relay request 712 may be a SLUEInfo message and include an index. The eNB 706 can send an RRC reconfiguration message 714 to the relay UE 704. In addition, the eNB 706 can send an RRC connection setup message 716 to the remote UE 702. For example, the RRC connection message can include an L2-ID and a C-RNTI associated with the relay UE 704 and/or the remote UE 702. The remote UE 702 can send a PC5-C message 718 to eNB 706 via the relay UE 704. In an aspect, the PC5-C message 718 may include an RRC connection set up complete and NAS attach request (NAS-AR).

The eNB 706 may transmit an S1 application protocol (S1-AP) initial UE message and NAS-AR 720 to MME 708. For example, the S1-AP provides the signaling service between E-UTRA and the EPC. The MME 708 may transmit an authentication request 722 to the eNB 706 once signaling service is established. For example, the authentication request 722 may include an S1-AP DL NAS transport and NAS authentication request. The eNB 706 may transmit an authentication request 724 to the remote UE 702. For example, the authentication request 724 may include an RRC DL Info Transfer and NAS authentication request. The remote UE 702 may send a PC5-C authentication response 726 to the eNB 706 via the relay UE 704. For example, the PC5-C authentication response 726 may include an RRC DL Info Transfer+NAS (Authentication Response).

The eNB 706 may transmit an authentication response 728 to the MME 708. For example, the authentication response 728 may include an S1-AP UL NAS Transport+NAS (Authentication Response). The MME 708 may transmit a security mode command 730 to the eNB 706. For example, the security mode command 730 may include an S1-AP DL NAS Transport+NAS (Security Mode Command). The eNB 706 may transmit a security code command 732 to the remote UE 702. For example, the security code command 732 may include an RRC DL Info Transfer+NAS (Security Mode Command). The remote UE 702 may transmit a security code complete message 734 to the eNB 706 via the relay UE 704.

The eNB 706 may transmit a security code complete message 736 to the MME 708. For example, the security code complete message 736 may include S1-AP UL NAS Transport+NAS (Security Mode Complete). The MME 708 may transmit an attach accept message 738 to the eNB 706. For example, the attach accept message 738 may include an S1-AP Initial Context Setup Request+NAS (Attach Accept+Default EPS Bearer Context Request) message. The eNB 706 may transmit the S-TMSI message 740 to the remote UE 702. For example, the S-TMSI message 740 may include RRC Connection Reconfiguration+NAS (Attach Accept+Default EPS Bearer Context Request).

The remote UE 702 may send a PC5-C RRC connection configuration complete message 742 to the eNB 706 via the relay UE 704. The eNB 706 may send a S1-AP initial context set up response message 744 to the MME 708. The remote UE 702 may send a PC5-C attach complete message 746 to the eNB 706. For example, the attach complete message 746 may include an RRC UL Info Transfer+NAS (Attach Complete+Activate Default EPS Bearer Context Accept) message. The eNB 706 may transmit a A1-AP UL transport message 748 to the MME 708.

The new RRC connection setup message 716 may include C-RNTI, Relay L2 ID, may optionally include UL configurations (e.g., dedicated PUSCH Tx power settings, etc.). To resolve contention, the eNB 706 can provide S-TMSI/IMSI of the remote UE 702 to one or more of the remote UE 702 and/or the relay UE 704. In addition, the eNB 706 may signal the remote UE 702 using a new preserved RNTI (e.g., RS-RNTI).

In the event that the relay UE 704 is moving, legacy handover procedures for the relay UE 704 to a new eNB may apply. For example, the relay UE 704 may determine to either tear down the PC5 protocol stack or keep the PC5 protocol stack for some time if the eNB 706 also moves the remote UE 702. Additionally and/or alternatively, the eNB 706 may send a dedicated trigger to the remote UE 702 to reinitiate relay solicitation.

In the event that the remote UE 702 is moving legacy idle/connected mode procedures may apply. For example, the eNB 706 may signal the remote UE 702 to tear down the PC5 protocol stack. The eNB 706 may determine if the remote UE-relay UE link is still available by determining if the RLC AM is used in the UL. Here, legacy procedures may apply, including radio link failure (RLF) if remote UE-eNB UL and/or DL links break. Additionally and/or alternatively, the determination may be made based on if the RLF UM for the UL is used, and then introduces a heartbeat signal. PDCP ACKs (e.g., number of packets received) can be used as a link heartbeat indication.

Figure 8:
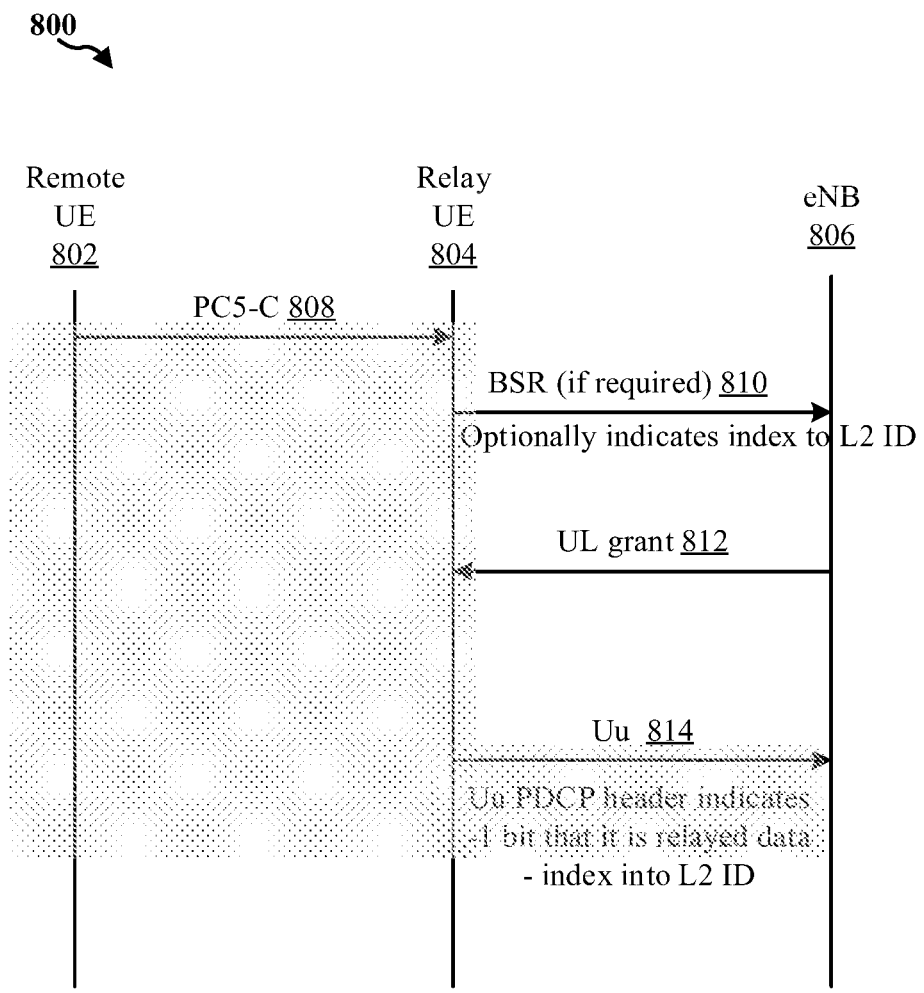
FIG. 8 is a flow diagram of a device-to-device communications system.

FIG. 8 illustrates a flow diagram 800 for an data tunneling procedure from a remote UE 802 to an eNB 806 via the relay UE 804. The shaded portion in FIG. 8 illustrates an UL data transmission from the remote UE 802 that is tunneled via the relay UE 804 to the eNB 806.

Referring to FIG. 8, the remote UE 802 can send a PC5-C data transmission 808 to the relay UE 804 for relaying to the eNB 806. The relay UE 804 may send a buffer status report (BSR) 810 to the eNB 806. Optionally, the BSR 80 may include and an index to the L2-ID associated with the relay UE 804 and/or the remote UE 802. The eNB 806 may transmit an UL grant 812 to the relay UE 804. The relay UE 804 may transmit a Uu data transmission 814 associated with the PC5-C data transmission 808 to the eNB 806. In an aspect, the Uu data transmission 814 may include a PDCP header that includes 1 bit of information indicating that the transmission 814 is relayed data and an index into the L2-ID of the remote UE 802.

Figure 9:
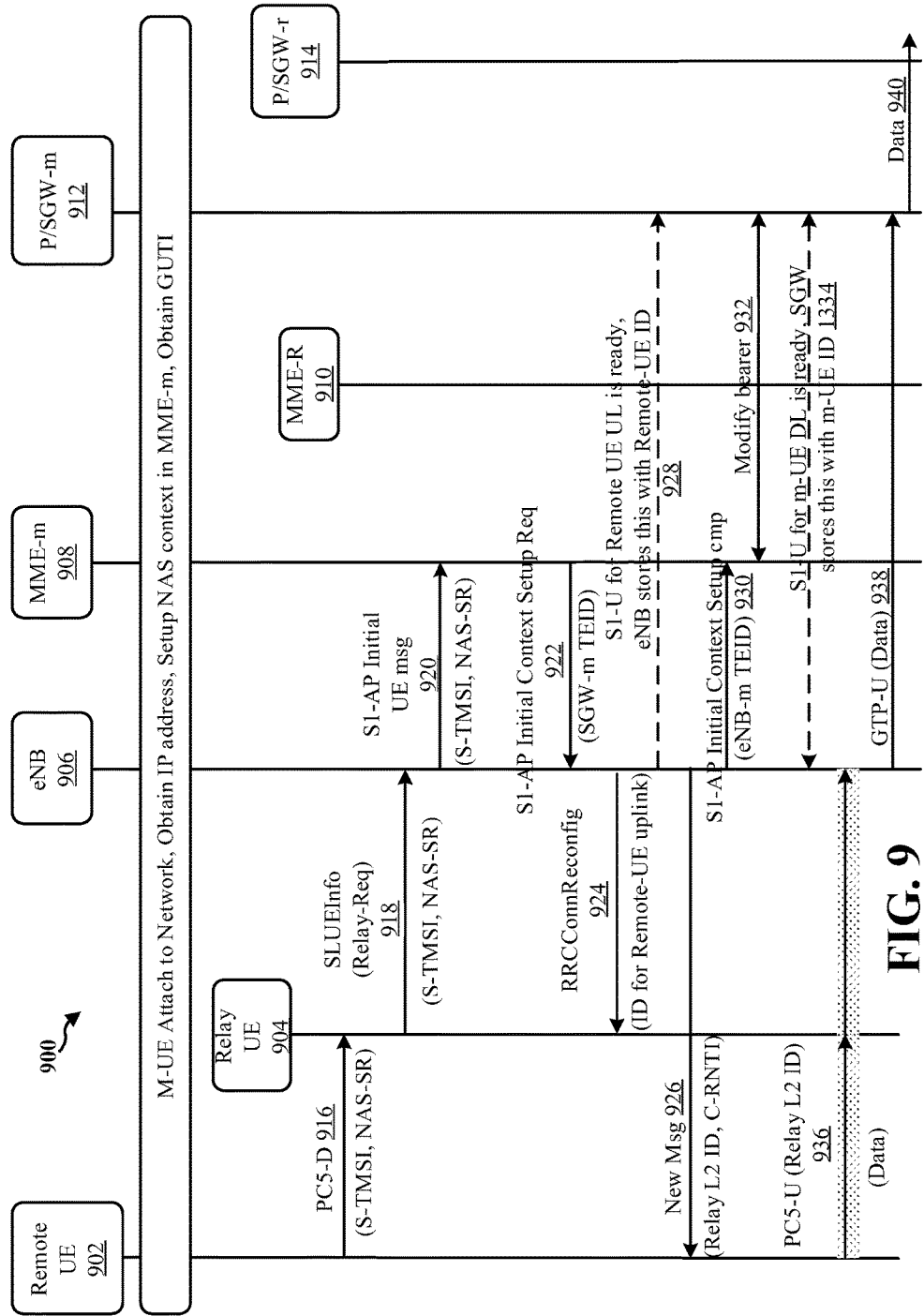
FIG. 9 is a flow diagram of a device-to-device communications system.

FIG. 9 illustrates a flow diagram 900 for a data tunneling procedure from a remote UE 902 to an eNB 906 via the relay UE 904. For example, the data tunneling procedure illustrated in FIG. 9 may commence after the remote UE 902 performs the attach procedure to the network and obtains the IMSI and/or globally unique temporary identifier (GUTI). The shaded portion in FIG. 9 illustrates an UL data transmission from the remote UE 902 that is tunneled via the relay UE 904 to the eNB 906.

In an aspect, the remote UE 902 may transmit a discovery message 916 to the relay UE 904. For example, the discovery message 916 may be a PC5-D discovery message that includes a S-TMSI and NAS search request (NAS-SR). The relay UE 904 may send a relay-request message 918 to the eNB 906. For example, the relay-request message may include the S-TMSI and NAS-SR received in the discovery message 916. The new discovery message 916 from the remote UE 902 for solicitation of the relay UE 904 for the purpose of UL data relaying from the remote UE 902 to the eNB 906 via the relay UE 904. For example, the discovery message may include contents (e.g. data), S-TMSI+NAS-SR (if S-TMSI is available), and/or IMSI/X+Indication for NAS-AR (e.g., actual NAR-AR sent over PC5-C). Here, "X" can be a value associated with the remote UE 902 that distinguishes the remote UE 902 from other UEs in communication with the eNB 906 via the relay UE 904. Moreover, the new discovery message 916 may also include a coverage level indication (e.g., the eNB 906 can use this for TTI bundling). The coverage level indication may include Uu reference signal received power (RSRP) (e.g., that relates to a signal power associated with a downlink transmission from the eNB 906 to the remote UE 902), coarse coverage level indication (e.g., good, poor, bad), and/or RACH ID (e.g., similar to narrowband internet of things (NB-IOT), the RACH ID may indicate the coverage level—instead of sending the RACH for DL UL, the remote UE 902 can indicate the RACH ID it would have used if direct UL communications with the eNB 906 is used and sends that in the PC5-D new discovery message 916).

The eNB 906 may send an S1-AP initial UE message 920 to MME-m 908. For example the message 920 may include the S-TMSI and NAS-RS sent in the PD5-D discovery message 916. The MME-m 908 may sent an S1-AP initial context setup request 922 to eNB 906 The set up request 922 may include the tunnel endpoint ID (TEID) of P/SGW-m 912. The eNB 906 may send an RRC connection reconfiguration message 924 to the relay UE 904. For example, the RRC connection reconfiguration message 924 may include an ID associated with the remote UE 902 for the relay UE 904 to use when relaying UL data from the remote UE 902 to the eNB 906. The eNB 906 may send a signal 928 to the P/SGW-m 912 indicating the S1-U UL transmission from the remote UE 902 is ready. In addition, the eNB 906 may store this with an ID of the remote UE 902. The eNB 906 may send a new message 926 to the remote UE 902. For example, the new message 926 may include an L2-ID and C-RNTI associated with the relay UE 904. The eNB 906 may send an S1-AP initial context setup message include context management procedures (cmp) 930 to the MME-m 908. For example, the context setup message 930 may include the eNB-m TEID. The MME-m 908 and P/SGW-m 912 may communicate a modify bearer message 932 to each other. The eNB 906 and P/SGW-m 912 may communicate that the S1-U DL data for the remote UE 902 (m-UE) is ready. The P/SGW-m 912 may store this information with the remote UE 902 (e.g., with an identifier of the remote UE 902). The remote UE 902 may send a PD5-U UL data transmission 936 to the eNB 906 via the relay UE 904. For example, the PD5-U transmission 936 may include the L2-ID of the relay UE 904. The eNB 906 may send a general packet radio service (GPRS) tunneling protocol (GTP-U) message 938 to the P/SGW-m 912. For example, the GTP-U message may include the UL data relayed from the remote UE 902. The P/SGW-m 912 may send the data 940 to the EPC.

Figure 10A:
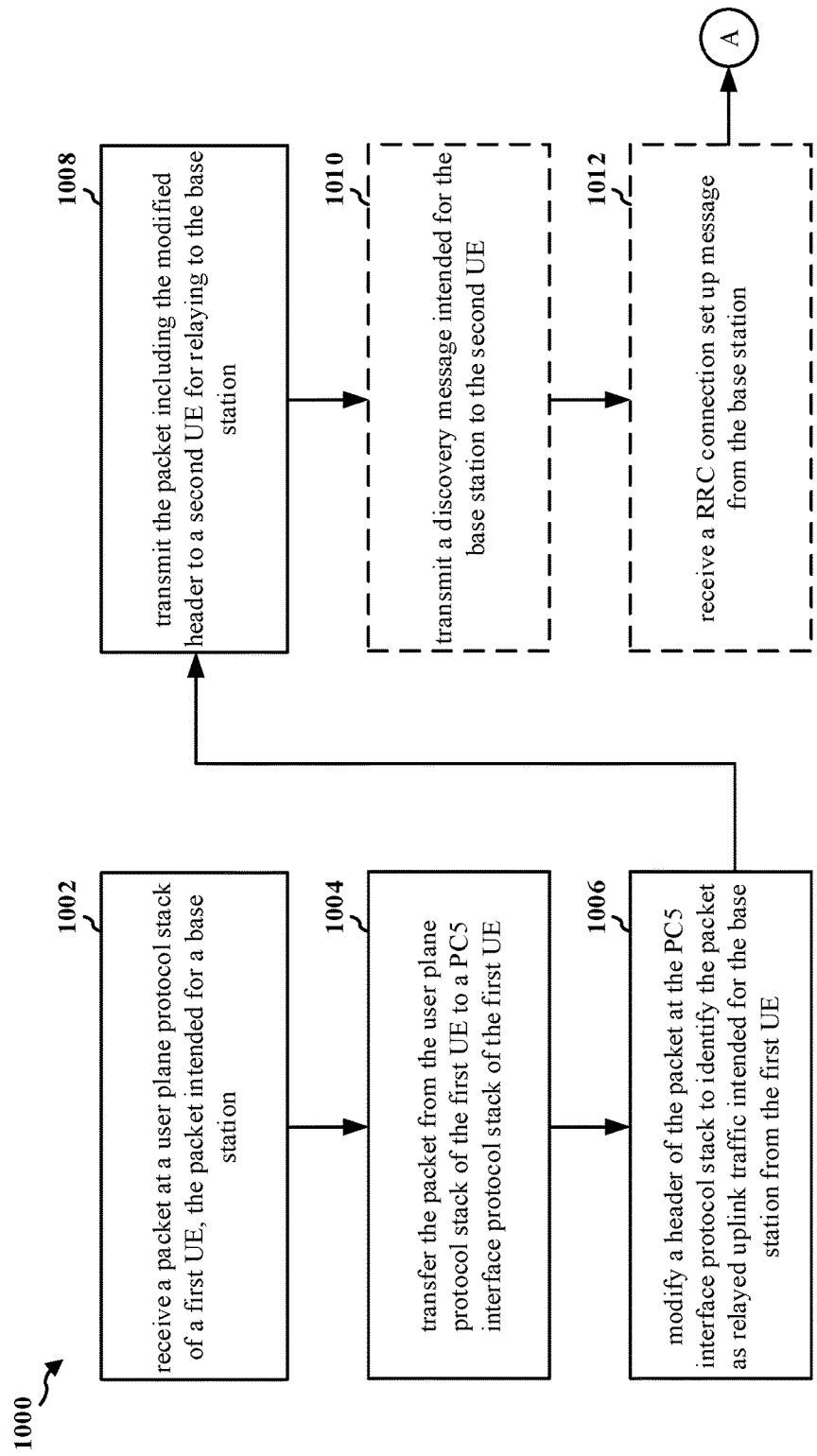
FIGS. 10A and 10B are a flowchart of a method of wireless communication.
Figure 10B:
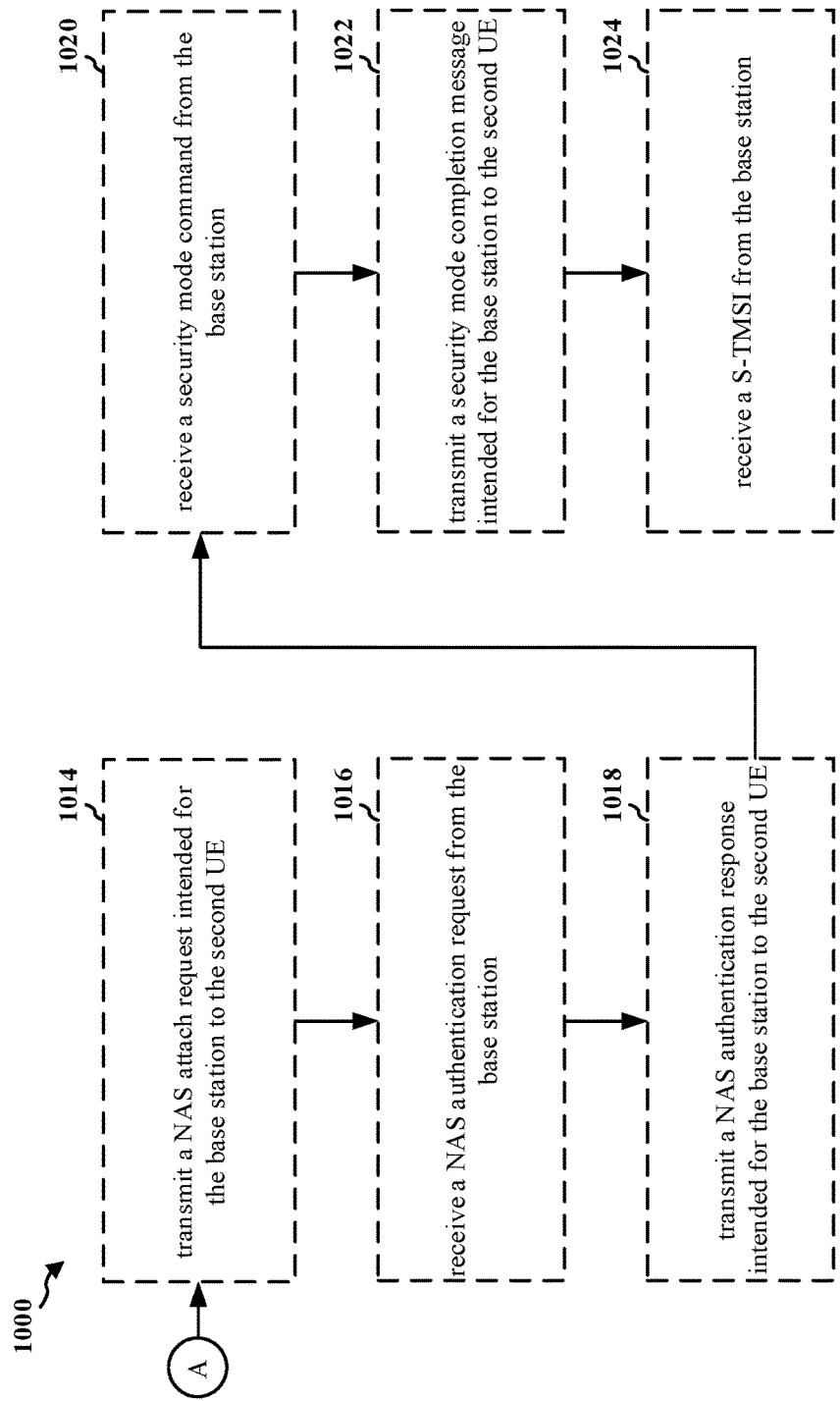

FIGS. 10A and 10B are a flowchart 1000 of a method of wireless communication. The method may be performed by a first UE (e.g., the remote UE 502 illustrated in FIGS. 5A-5C, remote UE 702 in FIG. 7, remote UE 802 in FIG. 8, and/or remote UE 902 in FIG. 9). The second UE may include the relay UE 504 illustrated in FIGS. 5A-5C, relay UE 704 in FIG. 7, relay UE 804 in FIG. 8, or relay UE 904 in FIG. 9. It should be understood that the operations indicated with dashed lines represent operations for various aspects of the disclosure.

In block 1002, the first UE can receive a packet at a user plane protocol stack of a first UE, the packet intended for a base station. For example referring to FIG. 5A a first packet may be received at the Uu 526 by the remote UE 502. The first packet may be intended for the eNB 506.

In block 1004, the first UE can transfer the packet from the user plane protocol stack of the first UE to a PC5 interface protocol stack of the first UE. For example, referring to FIG. 5A, the PDCP sublayer 516 in Uu 526 of the remote UE 502 transfers the first packet to the PDCP sublayer 518 in PC5 528.

In block 1006, the first UE can modify a header of the packet at the PC5 interface protocol stack to identify the packet as relayed uplink traffic intended for the base station from the first UE. For example, referring to FIG. 5A, the PDCP sublayer 518 of the remote UE 502 may modify a header of the first packet to identify the first packet as relayed uplink traffic intended for the base station from the remote UE 502. For example, the header can be modified to include a system architecture evolution (SAE) temporary mobile subscriber identity (S-TMSI) that the eNB 506 may use in identifying the first packet as originating from remote UE 502. In addition, the modified header may include PC5 PDCP header (e.g., 1 byte), 1 bit to indicate the first packet is relayed UL link traffic, and information that indicates the "heartbeat" for DL traffic (e.g., indicating that remote UE 502 can receive DL transmissions from the eNB 506).

In block 1008, the first UE can transmit the packet including the modified header to a second UE for relaying to the base station. For example, referring to FIG. 5A, the first packet including the modified header may be transferred down L1 524 in PC5 528. The first packet may then be transmitted by L1 524 of the remote UE 502 to the relay UE 504. In an aspect, the first packet may be received at L1 536 of PC5 552 in the relay UE 504.

In block 1010, the first UE can transmit a discovery message intended for the base station to the second UE. For example, referring to FIG. 7, the remote UE 702 can send a discovery message (PC5-D) 710 to the relay UE 704. In an aspect, the PC5-D 710 can include an IMSI associated with the remote UE 702, a number that distinguishes the remote UE 702 from other UEs communicating with the eNB 706 via the relay UE 704, an attach request, and/or Uu link quality.

In block 1012, the first UE can receive a RRC connection set up message from the base station. For example, referring to FIG. 7, the eNB 706 can send an RRC connection setup message 716 to the remote UE 702. For example, the RRC connection message can include an L2-ID associated with the relay UE 704 and C-RNTI associated with the remote UE 702.

As seen in FIG. 10B, in block 1014, the first UE can transmit a NAS attach request intended for the base station to the second UE. For example, referring to FIG. 7, the remote UE 702 can send a PC5-C message 718 to eNB 706 via the relay UE 704. In an aspect, the PC5-C message 718 may include an RRC connection set up complete and NAS attach request (NAS-AR).

In block 1016, the first UE can receive a NAS authentication request from the base station. For example, referring to FIG. 7, the eNB 706 may transmit an authentication request 724 to the remote UE 702. For example, the authentication request 724 may include an RRC DL Info Transfer and NAS authentication request.

In block 1018, the first UE can transmit a NAS authentication response intended for the base station to the second UE. For example, referring to FIG. 7, the remote UE 702 may send a PC5-C authentication response 726 to the eNB 706 via the relay UE 704. For example, the PC5-C authentication response 726 may include an RRC DL Info Transfer+NAS (Authentication Response).

In block 1020, the first UE can receive a security mode command from the base station. For example, referring to FIG. 7, the eNB 706 may transmit a security code command 732 to the remote UE 702. For example, the security code command 732 may include an RRC DL Info Transfer+NAS (Security Mode Command).

In block 1022, the first UE can transmit a security mode completion message intended for the base station to the second UE. For example, referring to FIG. 7, the remote UE 702 may transmit a security code complete message 734 to the eNB 706 via the relay UE 704.

In block 1024, the first UE can receive a S-TMSI from the base station. For example, referring to FIG. 7, the eNB 706 may transmit the S-TMSI message 740 to the remote UE 702. For example, the S-TMSI message 740 may include RRC Connection Reconfiguration+NAS (Attach Accept+Default EPS Bearer Context Request).

Figure 11A:
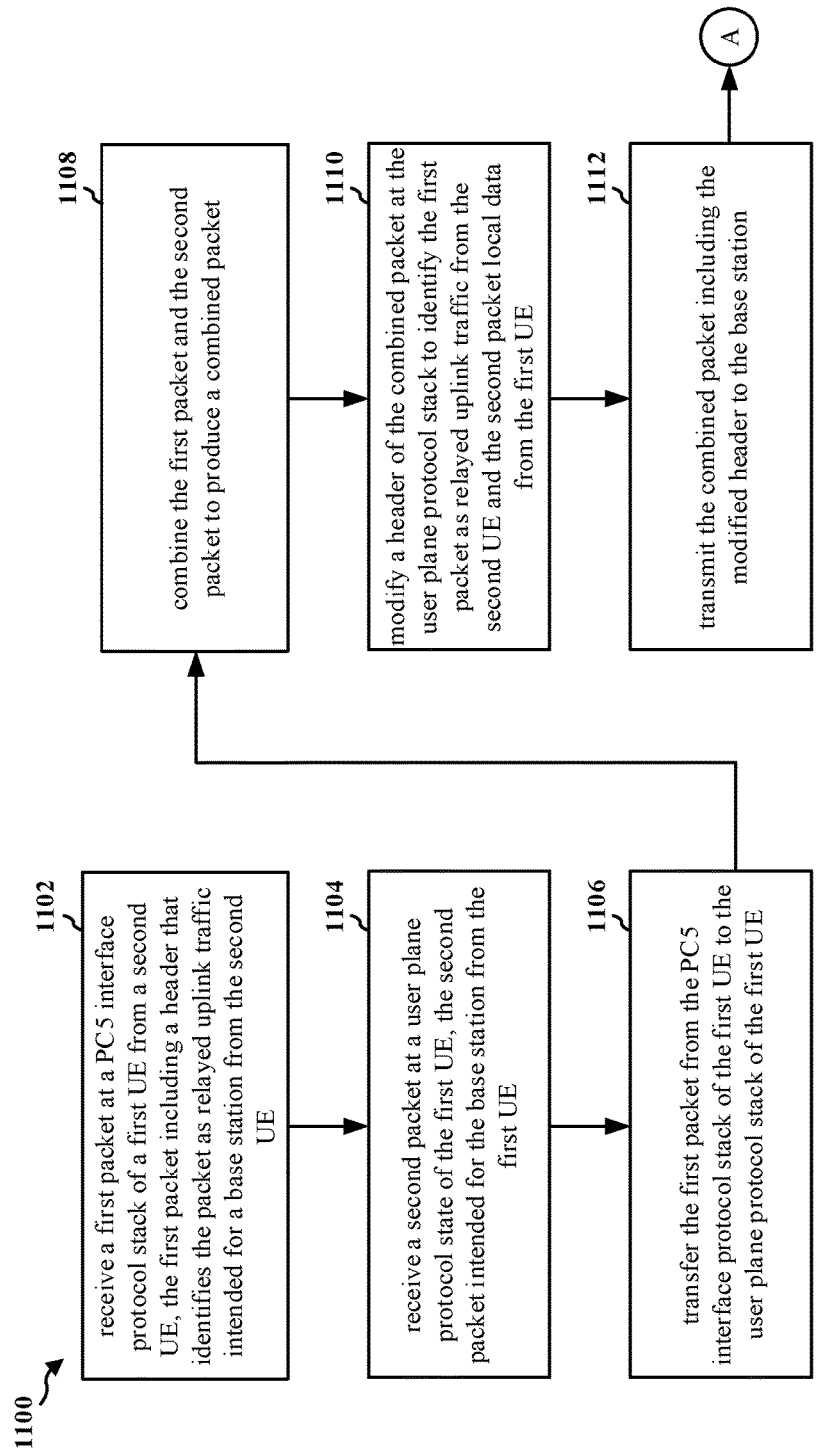
FIGS. 11A-11C are a flowchart of a method of wireless communication.
Figure 11B:
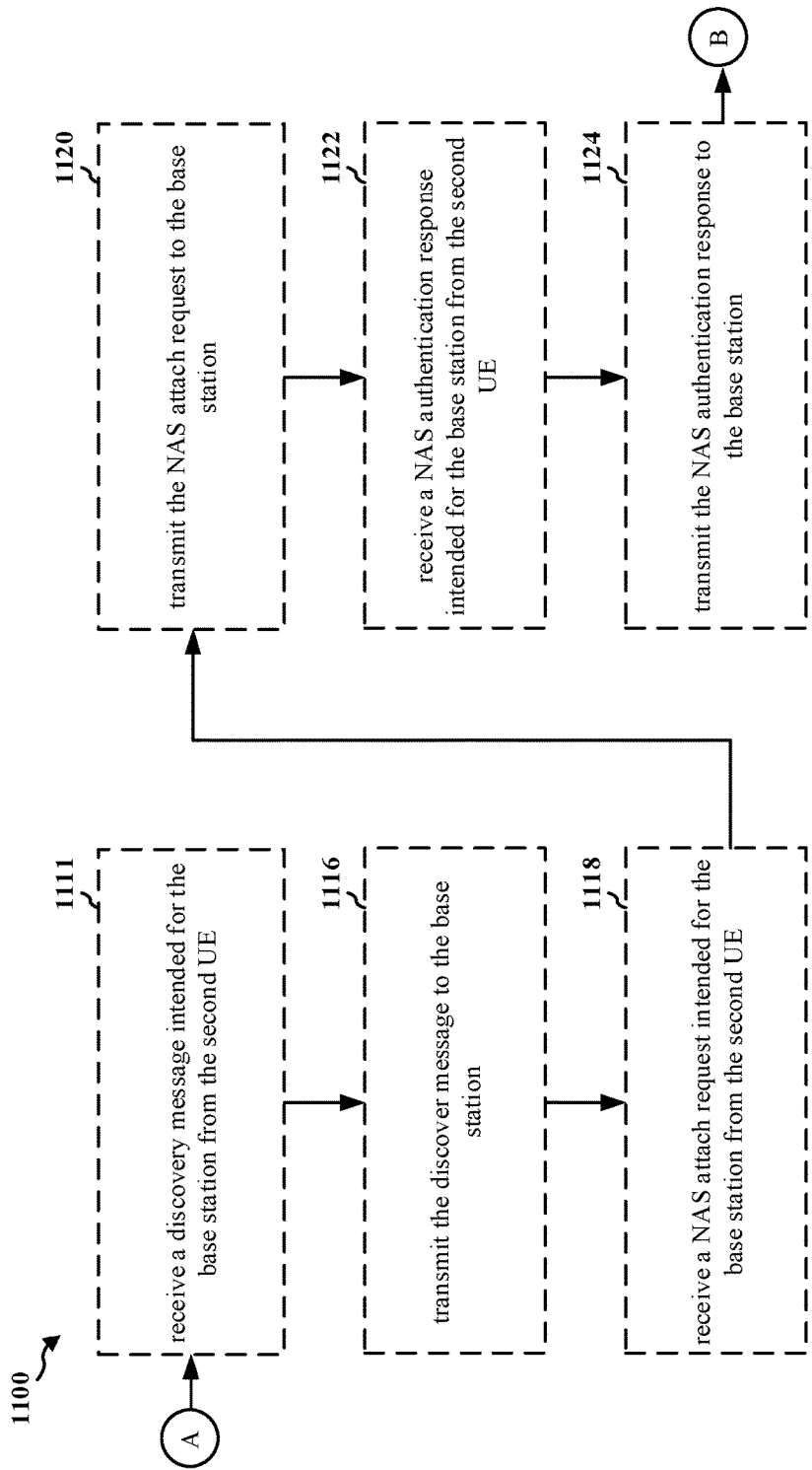
Figure 11C:
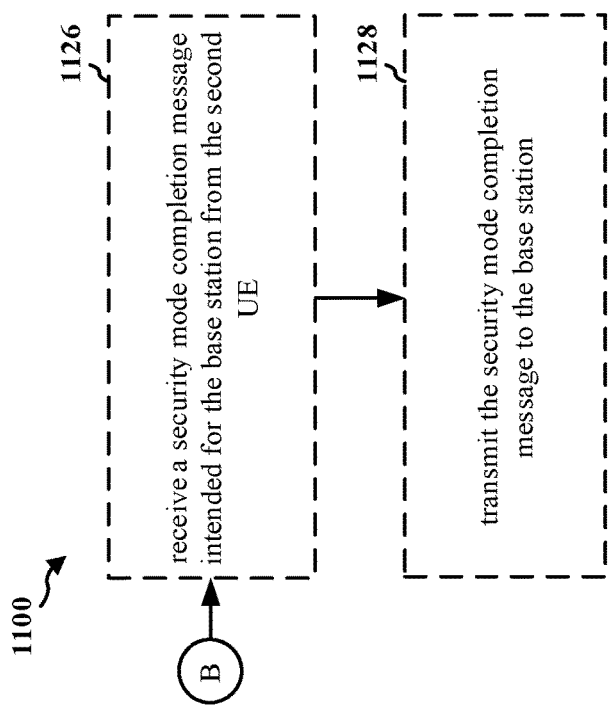

FIGS. 11A-11C are a flowchart 1100 of a method of wireless communication. The method may be performed by a first UE (e.g., the relay UE 504 illustrated in FIGS. 5A-5C, relay UE 704 in FIG. 7, relay UE 804 in FIG. 8, or relay UE 904 in FIG. 9). The second UE may include the remote UE 502 illustrated in FIGS. 5A-5C, remote UE 702 in FIG. 7, remote UE 802 in FIG. 8, and/or remote UE 902 in FIG. 9). It should be understood that the operations indicated with dashed lines represent operations for various aspects of the disclosure.

In block 1102, the first UE can receive a first packet at a PC5 interface protocol stack of a first UE from a second UE, the first packet including a header that identifies the packet as relayed uplink traffic intended for a base station from the second UE. For example, referring to FIG. 5, a first packet may be transmitted by L1 524 of the remote UE 502 to the relay UE 504. In an aspect, the first packet may be received at L1 536 of PC5 552 in the relay UE 504.

In block 1104, the first UE can receive a second packet at a user plane protocol stack of the first UE, the second packet intended for the base station from the first UE. For example, referring to FIG. 5, a second packet may be received at PDCP sublayer 540. For example, the second packet may be local data originating from the relay UE 504 and intended for eNB 506.

In block 1106, the first UE can transfer the first packet from the PC5 interface protocol stack of the first UE to the user plane protocol stack of the first UE. For example, referring to FIG. 5, the first packet may then be passed up through the sublayers of PC5 552 and PDCP sublayer 530 may transfer the first packet to the PDCP sublayer 540 in Uu 554.

In block 1108, the first UE can combine the first packet and the second packet to produce a combined packet. For example, referring to FIG. 5, the PDCP sublayer 540 may combine the first packet and the second packet since both are intended for eNB 506.

In block 1110, the first UE can modify a header of the combined packet at the user plane protocol stack to identify the first packet as relayed uplink traffic from the second UE and the second packet local data from the first UE. For example, referring to FIG. 5, the PDCP sublayer 540 may modify the header of the combined packet to identify the first packet as relayed uplink traffic from the remote UE 502 and the second packet local data from the relay UE 504. For example, the modified header of the combined packet may include an index of a layer 2 identification (L2-ID) table associated with the relay UE 504 and an index of a S-TMSI/IMSI table associated with the remote UE 502 (e.g., a ProSe L2-ID table to indicate the ProSe L2-ID of the source remote UE 502). The combined packet may be passed down through the sublayers in the Uu protocol stack 554. In addition, the modified header of the combined packet may include information (e.g., 1 bit) that indicates the first packet is being relayed from remote UE 502.

In block 1112, the first UE can transmit the combined packet including the modified header to the base station. For example, referring to FIG. 5, the combined packet including the modified header may be transmitted from the L1 layer 546 to the eNB 506.

As seen in FIG. 11B, in block 1114, the first UE can receive a discovery message intended for the base station from the second UE. For example, referring to FIG. 7, the remote UE 702 can send a discovery message (PC5-D) 710 to the relay UE 704. In an aspect, the PC5-D can include an IMSI associated with the remote UE 702, a number that distinguishes the remote UE 702 from other UEs communicating with the eNB 706 via the relay UE 704, an attach request, and/or Uu link quality.

In block 1116, the first UE can transmit the discover message to the base station. For example, referring to FIG. 7, the relay UE 704 can send a relay request 712 to the eNB 706. The relay request 712 may be a SLUEInfo message and include an index.

In block 1118, the first UE can receive a NAS attach request intended for the base station from the second UE. For example, referring to FIG. 7, the remote UE 702 can send a PC5-C message 718 to eNB 706 via the relay UE 704. In an aspect, the PC5-C message 718 may include an RRC connection set up complete and NAS attach request (NAS-AR).

In block 1120, the first UE can transmit the NAS attach request to the base station. For example, referring to FIG. 7, the remote UE 702 can send a PC5-C message 718 to eNB 706 via the relay UE 704. In an aspect, the PC5-C message 718 may include an RRC connection set up complete and NAS attach request (NAS-AR).

In block 1122, the first UE can receive a NAS authentication response intended for the base station from the second UE. For example, referring to FIG. 7, the remote UE 702 may send a PC5-C authentication response 726 to the eNB 706 via the relay UE 704. For example, the PC5-C authentication response 726 may include an RRC DL Info Transfer+NAS (Authentication Response).

In block 1124, the first UE can transmit the NAS authentication response to the base station. For example, referring to FIG. 7, the remote UE 702 may send a PC5-C authentication response 726 to the eNB 706 via the relay UE 704. For example, the PC5-C authentication response 726 may include an RRC DL Info Transfer+NAS (Authentication Response).

As seen in FIG. 11C, in block 1126, the first UE can receive a security mode completion message intended for the base station from the second UE. For example, referring to FIG. 7, the remote UE 702 may transmit a security code complete message 734 to the eNB 706 via the relay UE 704.

In block 1128, the first UE can transmit the security mode completion message to the base station. For example, referring to FIG. 7, the remote UE 702 may transmit a security code complete message 734 to the eNB 706 via the relay UE 704.

Figure 12A:
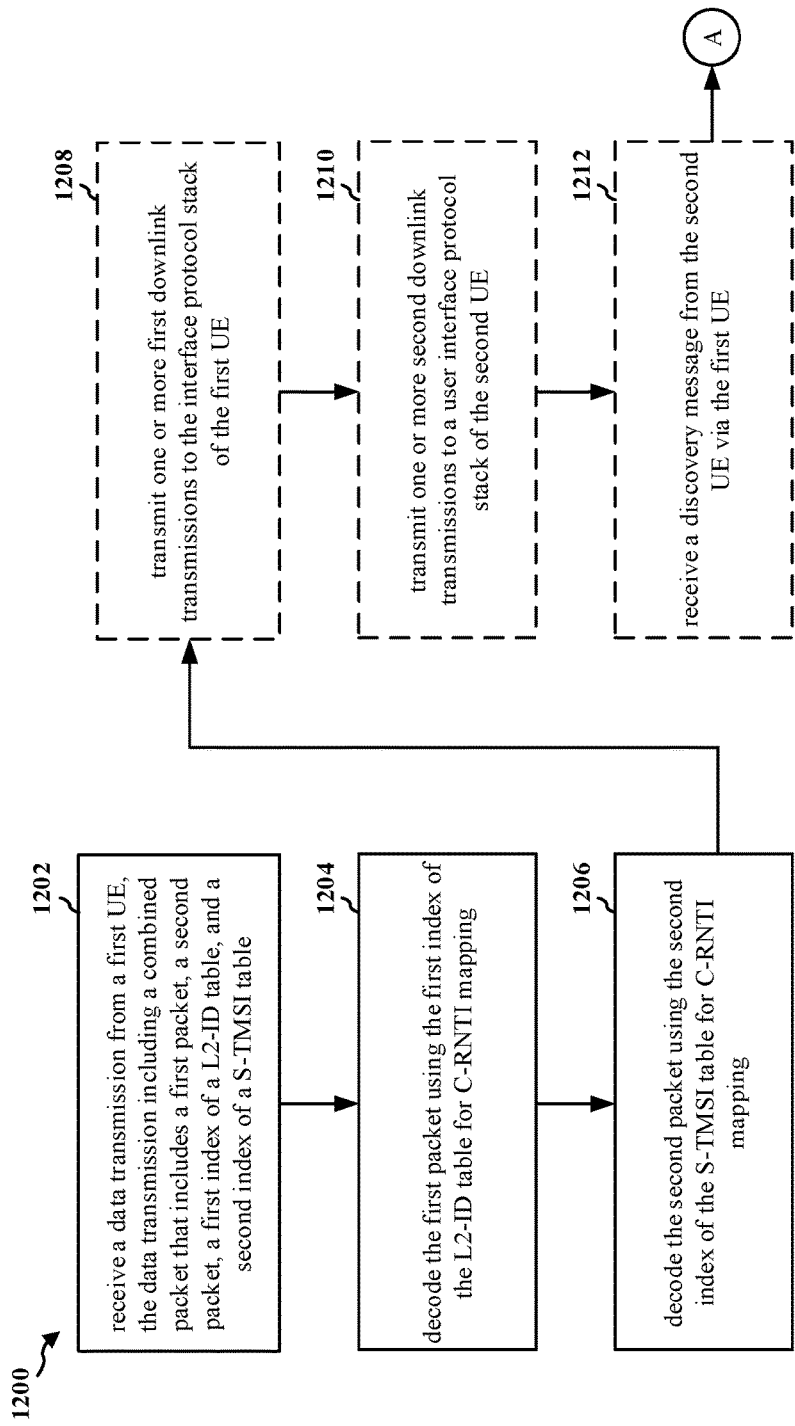
FIGS. 12A-12C are a flowchart of a method of wireless communication.
Figure 12B:
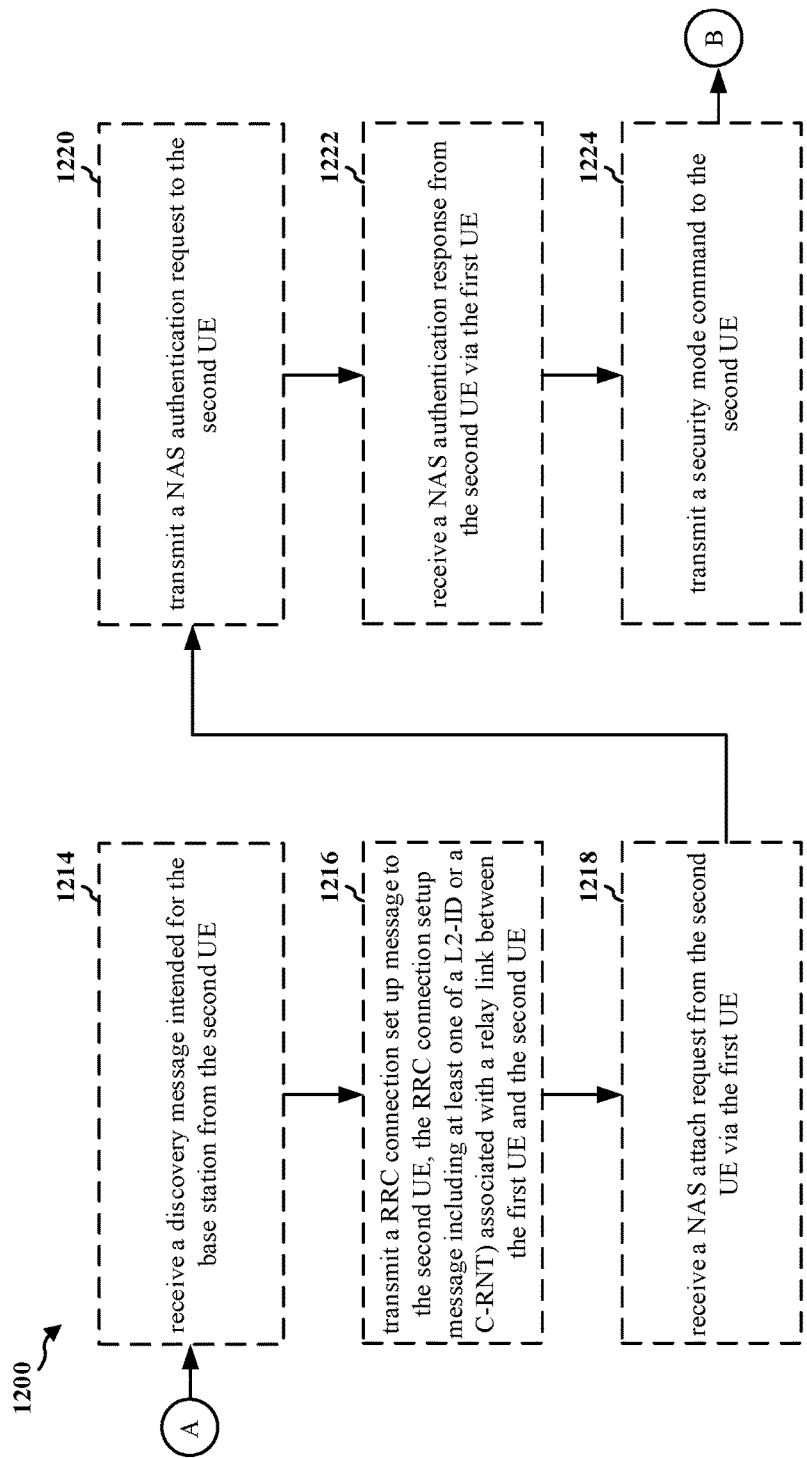
Figure 12C:
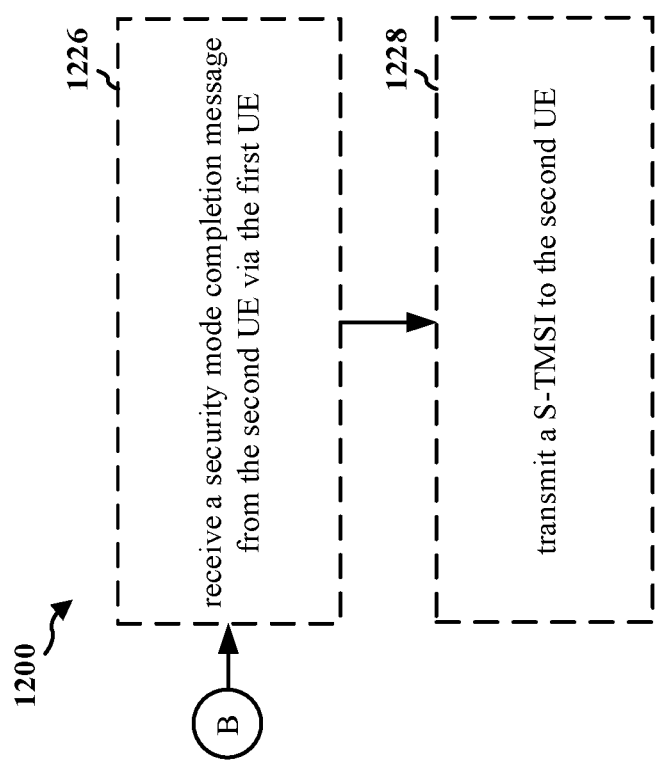

FIGS. 12A-12C are a flowchart 1200 of a method of wireless communication. The method may be performed by an eNB (e.g., the eNB 506 illustrated in FIGS. 5A-5C, eNB 706 in FIG. 7, eNB 806 in FIG. 8, or eNB 906 in FIG. 9) or base station. The first UE (e.g., the relay UE 504 illustrated in FIGS. 5A-5C, relay UE 704 in FIG. 7, relay UE 804 in FIG. 8, or relay UE 904 in FIG. 9). The second UE may include the remote UE 502 illustrated in FIGS. 5A-5C, remote UE 702 in FIG. 7, remote UE 802 in FIG. 8, and/or remote UE 902 in FIG. 9). It should be understood that the operations indicated with dashed lines represent operations for various aspects of the disclosure.

In block 1202, the eNB can receive a data transmission from a first UE, the data transmission including a combined packet that includes a first packet, a second packet, a first index of a L2-ID table, and a second index of a S-TMSI table. For example, referring to FIG. 5, the combined packet including a modified header may be received at the relay Uu protocol stack 572 of the eNB 506. The modified header of the combined packet may include an index of a layer 2 identification (L2-ID) table associated with the relay UE 504 and an index of a S-TMSI/IMSI table associated with the remote UE 502 (e.g., a ProSe L2-ID table to indicate the ProSe L2-ID of the source remote UE 502). The combined packet may be passed down through the sublayers in the Uu protocol stack 554. In addition, the modified header of the combined packet may include information (e.g., 1 bit) that indicates the first packet is being relayed from remote UE 502. The combined packet including the modified header may be transmitted from the L1 layer 546 to the eNB 506.

In block 1204, the eNB can decode the first packet using the first index of the L2-ID table for C-RNTI mapping. For example, referring to FIG. 5, the combined packet may be received at the L1 layer 556 of the relay Uu 572, and then passed up to the PDCP sublayer 562 where the modified header of the combined packet may be removed and decoded. The eNB 506 may decode the first packet using the index of the S-TMSI/IMSI table for C-RNTI mapping. Additionally, the eNB 506 may decode the second packet using the index of the L2-ID table for C-RNTI mapping. For example, the eNB 506 may use the index of the S-TMSI/IMSI to indicate the S-TMSI/IMSI for C-RNTI mapping for the remote UE 502 and route the first packet to the remote Uu 574. Alternatively, the eNB 506 may use the index of the ProSe L2-ID for C-RNTI mapping for the relay UE 504. In an aspect, the ProSe L2-ID/associated index and the S-TMSI/IMSI/associated index may be provided to the eNB 506 by the relay UE 504 in a SidelinkUEinformation message.

In block 1206, the eNB can decode the second packet using the second index of the S-TMSI table for C-RNTI mapping. For example, referring to FIG. 5, the combined packet may be received at the L1 layer 556 of the relay Uu 872, and then passed up to the PDCP sublayer 562 where the modified header of the combined packet may be removed and decoded. The eNB 506 may decode the first packet using the index of the S-TMSI/IMSI table for C-RNTI mapping. Additionally, the eNB 506 may decode the second packet using the index of the L2-ID table for C-RNTI mapping. For example, the eNB 506 may use the index of the S-TMSI/IMSI to indicate the S-TMSI/IMSI for C-RNTI mapping for the remote UE 502 and route the first packet to the remote Uu 574. Alternatively, the eNB 506 may use the index of the ProSe L2-ID for C-RNTI mapping for the relay UE 504. In an aspect, the ProSe L2-ID/associated index and the S-TMSI/IMSI/associated index may be provided to the eNB 506 by the relay UE 504 in a SidelinkUEinformation message.

In block 1208, the eNB can transmit one or more first downlink transmissions to the Uu interface protocol stack of the first UE. For example, referring to FIG. 5, the eNB 506 can send DL transmission to remote UE 502 via remote Uu 574.

In block 1210, the eNB can transmit one or more second downlink transmissions to a Uu protocol stack of the second UE. For example, referring to FIG. 5, the eNB 506 can send DL transmissions to relay UE 504 via relay Uu 572

In block 1212, the eNB can receive a discovery message from the second UE via the first UE. For example, referring to FIG. 7, the remote UE 702 can send a discovery message (PC5-D) 710 to the relay UE 704. In an aspect, the PC5-D 710 can include an IMSI associated with the remote UE 702, a number that distinguishes the remote UE 702 from other UEs communicating with the eNB 706 via the relay UE 704, an attach request, and/or Uu link quality.

As seen in FIG. 12B, in block 1214, the eNB can receive a discovery message intended for the base station from the second UE. For example, referring to FIG. 7, the relay UE 704 can send a relay request 712 to the eNB 706. The relay request 712 may be a SLUEInfo message and include an index.

In block 1216, the eNB can transmit a RRC connection set up message to the second UE, the RRC connection setup message including at least one of a L2-ID or a C-RNT) associated with a relay link between the first UE and the second UE. The eNB 706 can send an RRC reconfiguration message 714 to the relay UE 704. In addition, the eNB 706 can send an RRC connection setup message 716 to the remote UE 702. For example, the RRC connection message can include an L2-ID associated with the relay UE 704 and C-RNTI associated with the remote UE 702.

In block 1218, the eNB can receive a NAS attach request from the second UE via the first UE. For example, referring to FIG. 7, the remote UE 702 can send a PC5-C message 718 to eNB 706 via the relay UE 704. In an aspect, the PC5-C message 718 may include an RRC connection set up complete and NAS attach request (NAS-AR).

In block 1220, the eNB can transmit a NAS authentication request to the second UE. For example, referring to FIG. 7, the eNB 706 may transmit an authentication request 724 to the remote UE 702. For example, the authentication request 724 may include an RRC DL Info Transfer and NAS authentication request. The remote UE 702 may send a PC5-C authentication response 726 to the eNB 706 via the relay UE 704. For example, the PC5-C authentication response 726 may include an RRC DL Info Transfer+NAS (Authentication Response).

In block 1222, the eNB can receive a NAS authentication response from the second UE via the first UE. For example, referring to FIG. 7, the remote UE 702 may send a PC5-C authentication response 726 to the eNB 706 via the relay UE 704. For example, the PC5-C authentication response 726 may include an RRC DL Info Transfer+NAS (Authentication Response).

In block 1224, the eNB can transmit a security mode command to the second UE. For example, referring to FIG. 7, the eNB 706 may transmit a security code command 732 to the remote UE 702. For example, the security code command 732 may include an RRC DL Info Transfer+NAS (Security Mode Command).

As seen in FIG. 12C, in block 1226, the eNB can receive a security mode completion message from the second UE via the first UE. For example, referring to FIG. 7, the remote UE 702 may transmit a security code complete message 734 to the eNB 706 via the relay UE 704.

In block 1228, the eNB can transmit a S-TMSI to the second UE. For example, referring to FIG. 7, the eNB 706 may transmit the S-TMSI message 740 to the remote UE 702. For example, the S-TMSI message 740 may include RRC Connection Reconfiguration+NAS (Attach Accept+Default EPS Bearer Context Request).

Figure 13:
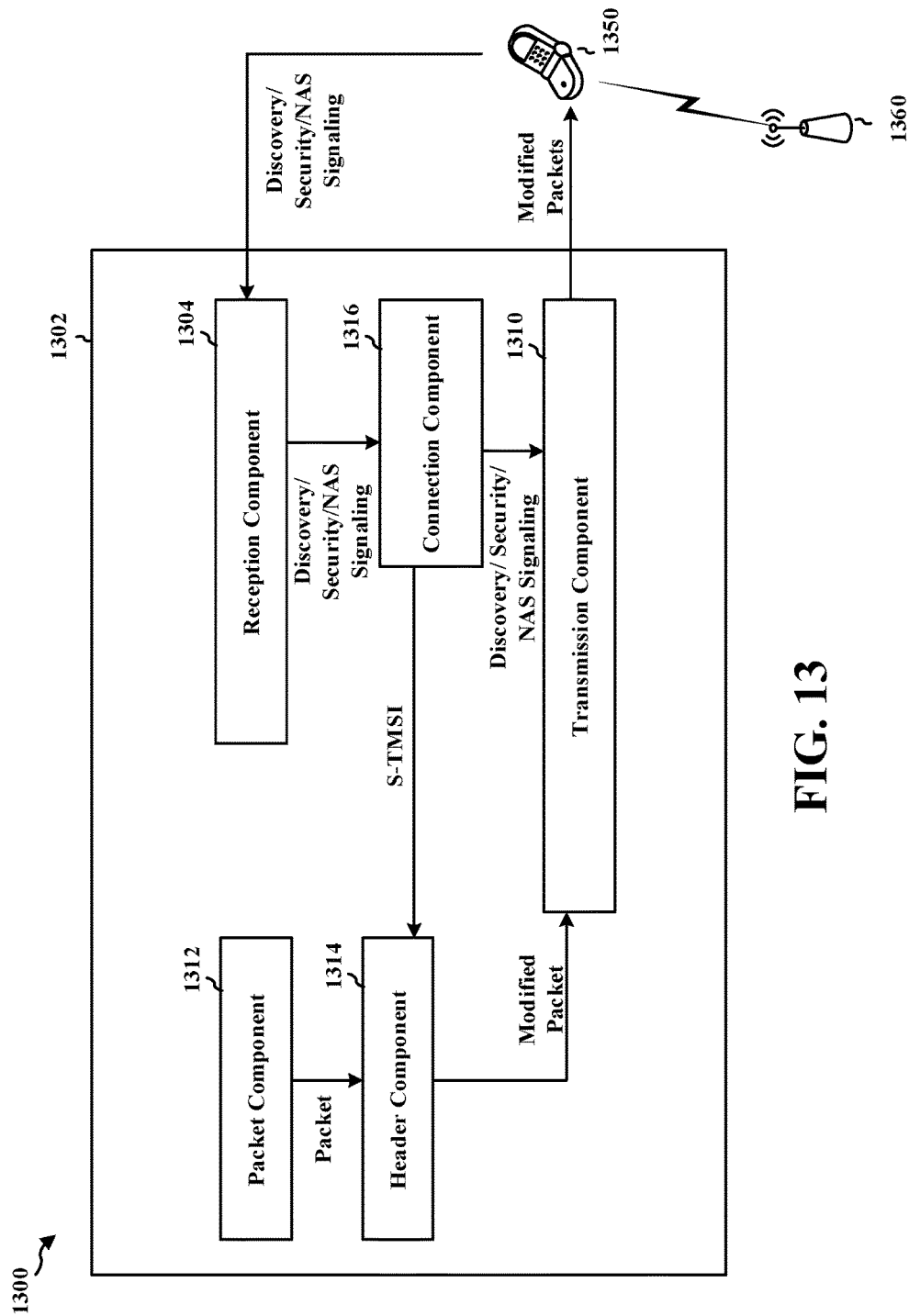
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE, such as the remote UE 502, the remote UE 702, the remote UE 802, and/or the remote UE 902. The apparatus 1302 may be configured to communicate with a base station 1360 through a relay UE 1350. The apparatus may be configured to receive signals from the relay UE 1350 using reception component 1304. The apparatus 1302 may be configured to transmit signals to the relay UE 1350 using the transmission component 1310 (e.g., signals intended for the base station 1360).

The apparatus 1302 may include a connection component 1316. The connection component may be configured to generate a discovery message intended for the base station 1360. The discovery message may include an indication of an attach request and at least one of an IMSI associated with the apparatus 1302, a value that distinguishes the apparatus 1302 from other apparatuses communicating with the base station 1360 via the relay UE 1350, a cell ID, or an L2-ID of the apparatus 1302. The apparatus may provide this discovery message to the transmission component 1310.

Based on the discovery message, the connection component 1316 may receive, through the reception component 1304, a response associated with an RRC connection set up message from the base station 1360. The response message may include at least one of a C-RNTI or an L2-ID associated with a relay link between the apparatus 1302 and the relay UE 1350.

The connection component 1316 may be further configured to cause the transmission component 1310 to transmit an NAS attach request intended for the base station 1360. The connection component 1316 may be configured to generate the NAS attach request.

Based on the attach request, the connection component 1310 may receive, through the reception component 1304, an NAS authentication request from the base station 1360. In response, the connection component 1316 may be configured to cause the transmission component 1310 to transmit, to the relay UE 1350, an NAS authentication response for the base station 1360. The connection component 1316 may generate the NAS authentication response based on the NAS authentication request.

The connection component 1316 may receive, through the reception component 1304, a security mode command from the base station 1360 (e.g., in response to the NAS authentication response). The connection component 1316 may generate a security mode completion message intended for the base station 1360 (e.g., in response to the security mode command). The connection component 1316 may cause the transmission component 1310 to transmit the security mode completion message to the relay UE 1350, so that the security mode completion message can be relayed to the base station 1360.

The connection component 1316 may receive, through the reception component 1304, an S-TMSI from the base station 1360. The connection component 1316 may provide the S-TIMSI to a header component 1314.

In aspects, the apparatus 1302 may further include a packet component 1312. The packet component 1312 may be configured to receive a packet at a Uu protocol stack of the apparatus 1302 (e.g., the packet component 1312 may include or may be communicatively coupled with a Uu protocol stack). The packet may be intended for the base station 1360. The packet component 1312 may generate this packet. The packet component 1312 may be configured to transfer the packet from the Uu protocol stack to a PC5 interface protocol stack of the apparatus 1302. The packet component 1312 may provide this packet to the header component 1314.

The header component 1314 may be configured to modify a header of the packet. The header component 1314 may be included in or may be communicatively coupled with a PC5 interface protocol stack of the apparatus 1302. The header component 1314 may modify the packet to identify the packet as relayed uplink traffic intended for the base station 1360 from the apparatus 1302. In an aspect, the header component 1314 may modify the packet by modifying a header of the packet to include the S-TMSI. The header component 1314 may then provide the modified packet to the transmission component 1310 for transmission to the base station 1360 through the relay UE 1350.

The apparatus may include additional components that perform each of the blocks of the algorithm in the aforementioned flowcharts of FIGS. 7-9, 10A, and 10B. As such, each block in the aforementioned flowcharts of FIGS. 7-9, 10A, and 10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
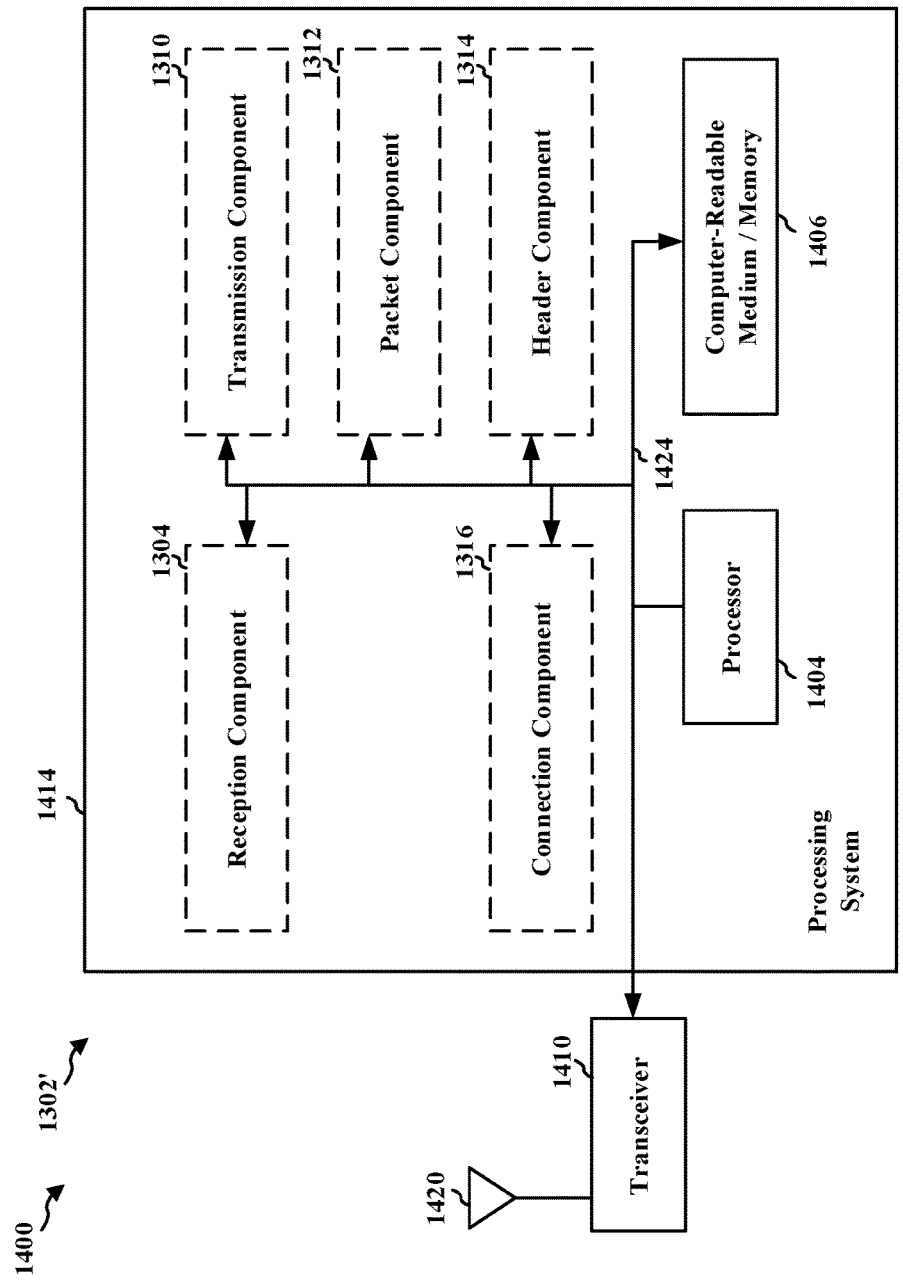
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1310, 1312, 1314, 1316, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1310, 1312, 1314, 1316. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving a packet at a Uu protocol stack of a first user equipment (UE), the packet intended for a base station. The apparatus 1302/1302' further includes means for transferring the packet from the Uu protocol stack of the first UE to a PC5 interface protocol stack of the first UE. The apparatus 1302/1302' further includes means for modifying a header of the packet at the PC5 interface protocol stack to identify the packet as relayed uplink traffic intended for the base station from the first UE. The apparatus 1302/1302' further includes means for transmitting the packet including the modified header to a second UE for relaying to the base station.

In an aspect, the apparatus 1302/1302' may further include means for transmitting a discovery message intended for the base station to the second UE, the discovery message including an indication of attach request and at least one of an international mobile subscriber identity (IMSI) associated with the first UE, a value that distinguishes the first UE from other UEs communicating with the base station via the second UE, cell ID, or a layer 2 identification (L2-ID) of the first UE. In an aspect, the apparatus 1302/1302' may further include means for receiving a response associated with radio resource control (RRC) connection set up message from the base station, the response message including at least one of a cell radio temporary identifier (C-RNTI) or a layer 2 identification (L2-ID) associated with a relay link between the first UE and the second UE.

In an aspect, the apparatus 1302/1302' may further include means for transmitting a non-access stratum (NAS) attach request intended for the base station to the second UE. In an aspect, the apparatus 1302/1302' may further include means for receiving a NAS authentication request from the base station.

In an aspect, the apparatus 1302/1302' may further include means for transmitting a NAS authentication response intended for the base station to the second UE. In an aspect, the apparatus 1302/1302' may further include means for receiving a security mode command from the base station.

In an aspect, the apparatus 1302/1302' may further include means for transmitting a security mode completion message intended for the base station to the second UE. In an aspect, the apparatus 1302/1302' may further include means for receiving a system architecture evolution (SAE) temporary mobile subscriber identity (S-TMSI) from the base station. In an aspect, the means for modifying the header of packet is configured to modify the header of the packet to include the S-TMSI.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
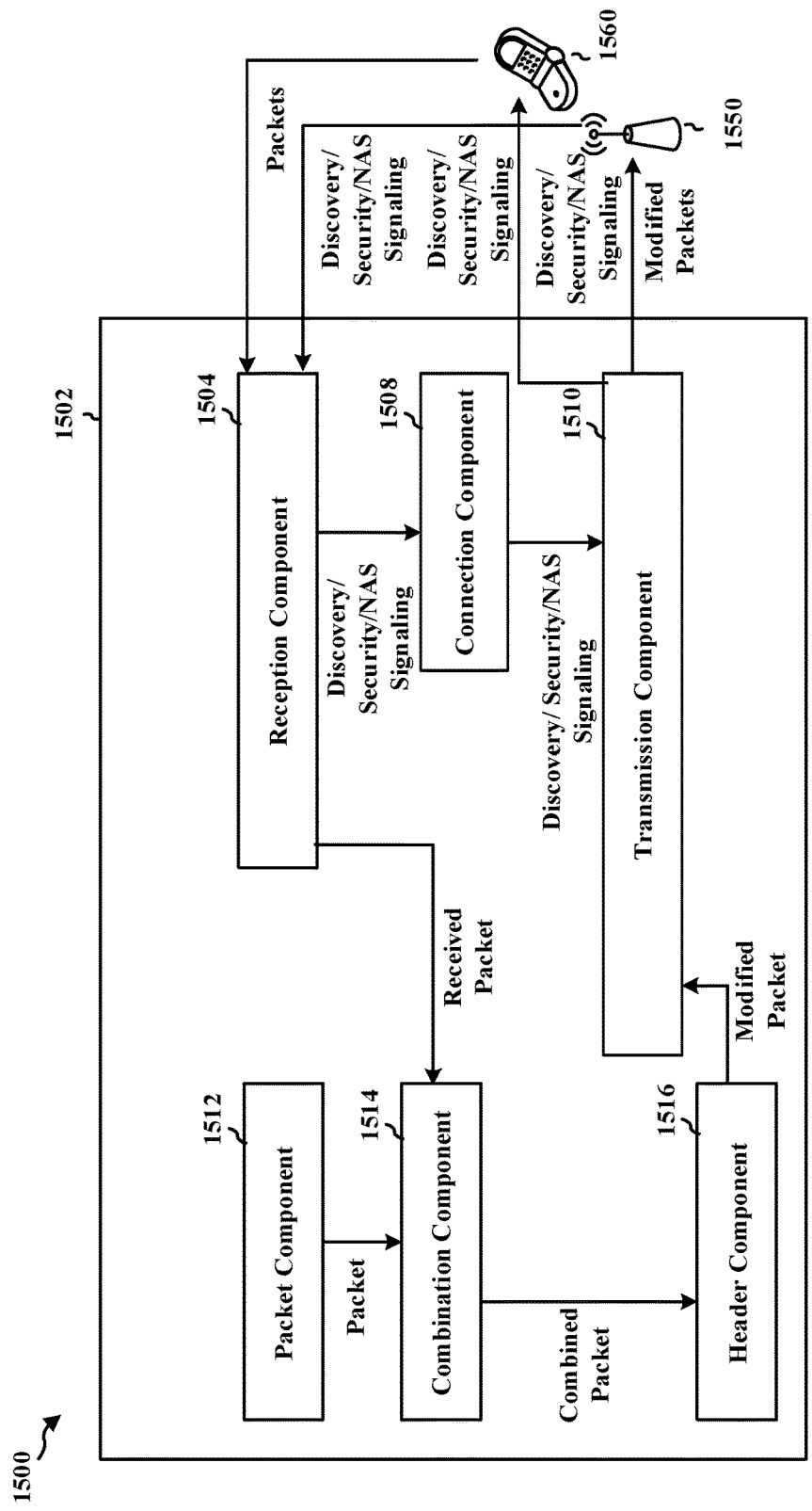
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus 1502 may be a UE, such as the relay UE 504, the relay UE 704, the relay UE 804, and/or the relay UE 904. The apparatus 1502 includes a reception component 1504 configured to receive signals from a remote UE 1560 and/or a base station 1550. The apparatus further includes a transmission component 1510 configured to transmit signals to the remote UE 1560 and/or the base station 1550.

In an aspect, the apparatus 1502 includes a connection component 1508. The connection component 1508 may be configured to receive, through the reception component 1504, a discovery message intended for the base station 1550 from the remote UE 1560. The discovery message may include an attach request indication and at least one of an IMSI associated with the remote UE 1560 or a value that distinguishes the remote UE 1560 from other UEs communication with the base station 1550 via the apparatus 1502. The connection component 1508 may be configured to cause transmission of the discovery message to the base station 1550 using the transmission component 1510.

In an aspect, the connection component 1508 may be further configured to receive, through the reception component 1504, an NAS attach request intended for the base station 1550 from the remote UE 1560. The connection component 1508 may be configured to cause transmission of the NAS attach request to the base station 1550 using the transmission component 1510.

In an aspect, the connection component 1508 may be further configured to receive, through the reception component 1504, an NAS authentication response intended for the base station 1550 from the remote UE 1560. The connection component 1508 may be configured to transmit the NAS authentication response to the base station 1550 using the transmission component 1510.

In an aspect, the reception component 1504 may be configured to receive a first packet from the remote UE 1560. The reception component 1504 may provide the first packet to a combination component 1514. The first packet may include a header that identifies the first packet as relayed uplink traffic intended for the base station 1550 from the remote UE 1560. The combination component 1514 may be configured to receive the first packet at a PC5 interface protocol stack of the apparatus 1502. The combination packet 1514 may be configured to transfer the first packet from the PC5 interface protocol stack of the apparatus 1502 to a Uu protocol stack of the apparatus 1502.

In an aspect, the apparatus 1502 may further include a packet component 1512. The packet component 1512 may generate a second packet for the apparatus 1512. The second packet may be intended for the base station 1550 from the apparatus 1502. The packet component 1512 may be configured to provide the second packet to the combination component 1514.

The combination component 1514 may be configured to receive the second packet at the Uu protocol stack of the apparatus 1502. The combination component 1514 may be configured to combine the first packet with the second packet to produce a combined packet. The combination component 1514 may be configured to provide the combined packet to a header component 1516.

The header component 1516 may be configured to modified a header of the combined packet. The header component 1516 may modify the header at the Uu protocol stack of the apparatus 1502. The header component 1516 may modify the header of the combined packet to identify the first packet a relayed uplink traffic from the remote UE 1560 and the second packet as local data from the apparatus 1502. In an aspect, the header component 1516 may modify the header to include an index of an L2-ID table associated with the apparatus 1502 and/or an index of an S-TMSI associated with the remote UE 1560.

The header component 1516 may provide the combined packet having the modified header to the transmission component 1510. The transmission component 1510 may be configured to transmit the combined packet having the modified header to the base station 1550.

The apparatus may include additional components that perform each of the blocks of the algorithm in the aforementioned flowcharts of FIGS. 7-9, 11A, 11B, and 11C. As such, each block in the aforementioned flowcharts of FIGS. 7-9, 11A, 11B, and 11C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
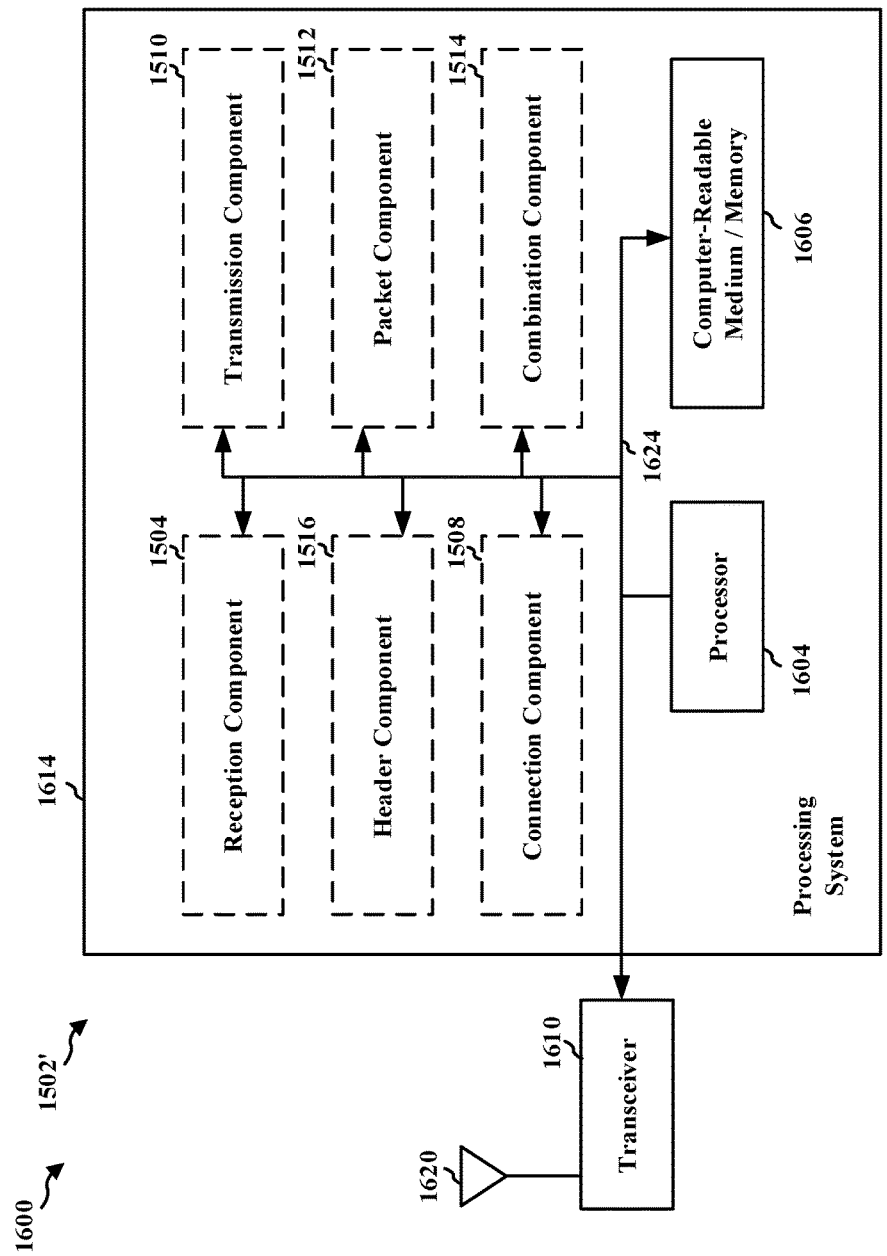
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1508, 1510, 1512, 1514, 1516, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1508, 1510, 1512, 1514, 1516. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for receiving a first packet at a PC5 interface protocol stack of a first user equipment (UE) from a second UE, the first packet including a header that identifies the first packet as relayed uplink traffic intended for a base station from the second UE. The apparatus 1502/1502' may further include means for receiving a second packet at a Uu protocol stack of the first UE, the second packet intended for the base station from the first UE. The apparatus 1502/1502' may further include means for transferring the first packet from the PC5 interface protocol stack of the first UE to the Uu protocol stack of the first UE. The apparatus 1502/1502' may further include means for combining the first packet and the second packet to produce a combined packet. The apparatus 1502/1502' may further include means for modifying a header of the combined packet at the Uu protocol stack to identify the first packet as relayed uplink traffic from the second UE and the second packet local data from the first UE. The apparatus 1502/1502' may further include means for transmitting the combined packet including the modified header to the base station.

In an aspect, the modified header includes an index of a layer 2 identification (L2-ID) table associated with the first UE and an index of a system architecture evolution (SAE) temporary mobile subscriber identity (S-TMSI) table associated with the second UE.

In an aspect, the apparatus 1502/1502' may further include means for receiving a discovery message intended for the base station from the second UE, the discovery message including an attach request indication and at least one of an international mobile subscriber identity (IMSI) associated with the second UE or a value that distinguishes the second UE from other UEs communicating with the base station via the first UE. The apparatus 1502/1502' may further include means for transmitting the discover message to the base station.

In an aspect, the apparatus 1502/1502' may further include means for receiving a non-access stratum (NAS) attach request intended for the base station from the second UE. The apparatus 1502/1502' may further include means for transmitting the NAS attach request to the base station.

In an aspect, the apparatus 1502/1502' may further include means for receiving a NAS authentication response intended for the base station from the second UE. The apparatus 1502/1502' may further include means for transmitting the NAS authentication response to the base station. The apparatus 1502/1502' may further include means for receiving a security mode completion message intended for the base station from the second UE. The apparatus 1502/1502' may further include means for transmitting the security mode completion message to the base station.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
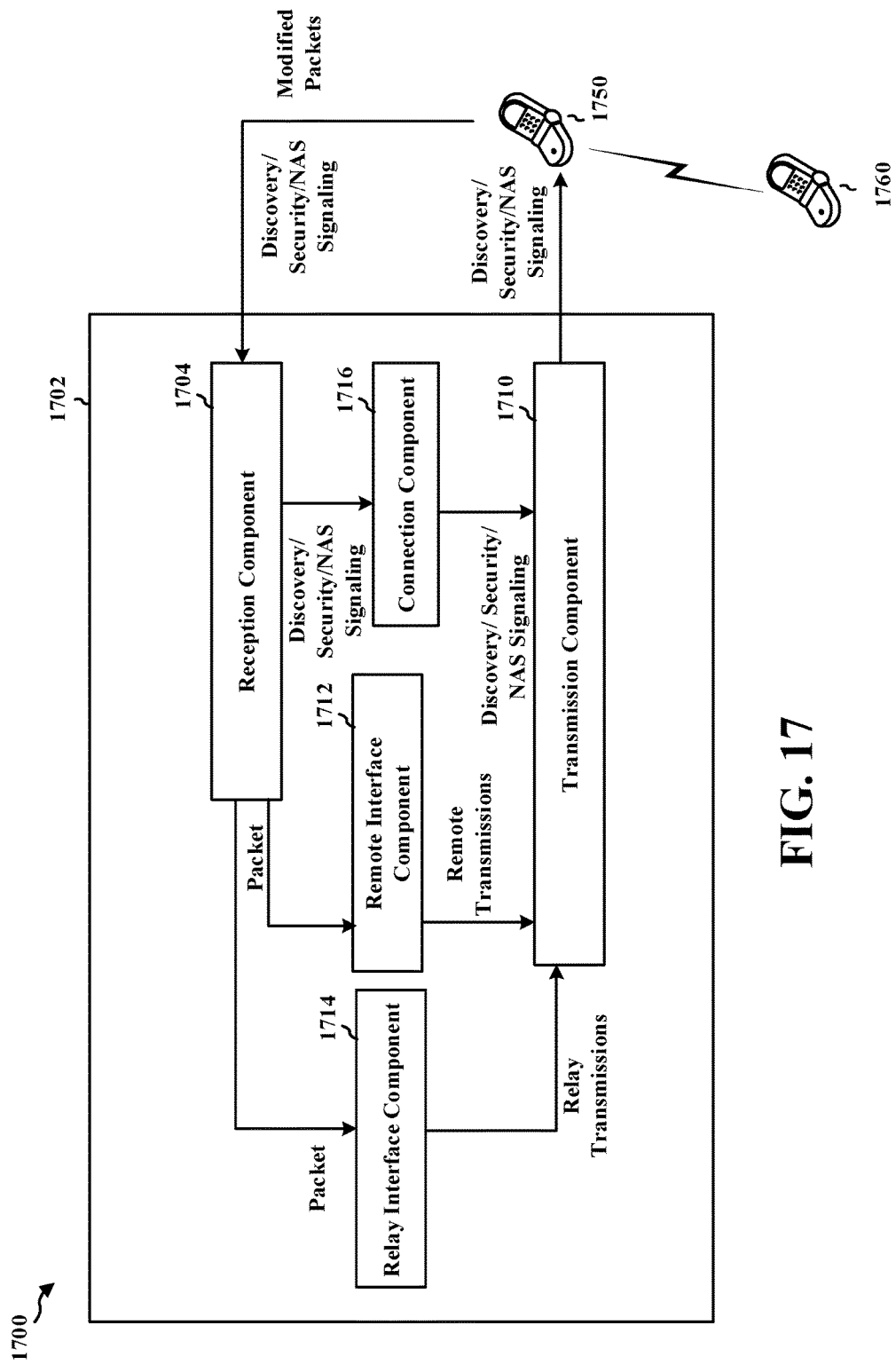
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be an eNB, such as the eNB 506, the eNB 706, the eNB 806, and/or the eNB 906. The apparatus 1702 includes a reception component 1704 configured to receive signals from a relay UE 1750, some of which may originate at a remote UE 1760. The apparatus further includes a transmission component 1710 configured to transmit signals to the relay UE 1750, some of which may be relayed to the remote UE 1760.

In an aspect, the apparatus 1702 may include a connection component 1716. The connection component 1716 may be configured to receive, through the reception component 1704, a discovery message from the remote UE 1760 via the relay UE 1750. The discovery message may include an attach request and at least one of an IMSI associated with the remote UE 1760 or a value that distinguishes the remote UE 1760 from other UEs communicating with the apparatus 1702 via the relay UE 1750.

The connection component 1716 may be configured to cause the transmission component to transmit an RRC connection set up message to the remote UE 1760 through the relay UE 1750. The connection component 1716 may generate the RRC connection set up message, for example, in response to the attach request. In an aspect, the connection setup message may include at least one of an L2-ID or a C-RNTI associated with a relay link between the remote UE 1760 and the relay UE 1750.

The connection component 1716 may be configured to receive, through the reception component 1704, an NAS attach request from the remote UE 1760 via the relay UE 1750. The connection component 1716 may be configured to generate an NAS authentication request based on the NAS attach request. The connection component 1716 may be configured to cause transmission, through the transmission component 1710, of the NAS authentication request to the remote UE 1760 via the relay UE 1750.

The connection component 1716 may be configured to receive, through the reception component 1704, an NAS authentication response from the remote UE 1760 via the relay UE 1750. The connection component 1716 may be configured to determine a security mode command for the remote UE 1760 based on the NAS authentication response. The connection component 1716 may be configured to cause transmission, through the transmission component 1710, of the security mode command to the remote UE 1760 through the relay UE 1750.

The connection component 1716 may be configured to receive, through the reception component 1704, a security mode completion message from the remote UE 1760 via the relay UE 1750. The connection component 1716 may be configured to determine an S-TMSI for the remote UE 1760 based on the security mode completion message. The connection component 1716 may be configured to cause transmission, through the transmission component 1710, of the S-TMSI to the remote UE 1760 through the relay UE 1750.

In an aspect, the apparatus 1702 may receive a data transmission through the reception component 1704. The data transmission may include a first packet associated with the relay UE 1750, a second packet from the remote UE 1760, a first index of an L2-ID table associated with the relay UE 1750, and a second index of an S-TMSI table associated with the remote UE 1760. In an aspect, a first packet from the data transmission may be provided to a relay interface component 1714. In an aspect, a second packet from the data transmission may be provided to a remote interface component 1712.

The relay interface component 1714 may be configured to decode the first packet using the first index of the L2-ID table for C-RNTI mapping. The relay interface protocol component 1714 may be further configured to determine one or more first downlink transmissions for the remote UE 1760. The relay interface protocol component 1714 may be configured to cause transmission, through the transmission component 1710, of the one or more first downlink transmissions to a Uu interface protocol stack of the relay UE 1750.

The remote interface component 1712 may be configured to decode the second packet using the second index of the S-TMSI table for C-RNTI mapping. The remote interface protocol component 1712 may be further configured to determine one or more second downlink transmissions for the remote UE 1760. The remote interface protocol component 1712 may be configured to cause transmission, through the transmission component 1710, of the one or more second downlink transmissions to a Uu interface protocol stack of the remote UE 1760.

The apparatus may include additional components that perform each of the blocks of the algorithm in the aforementioned flowcharts of FIGS. 7-9, 12A, 12B, and 12C. As such, each block in the aforementioned flowcharts of FIGS. 7-9, 12A, 12B, and 12C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
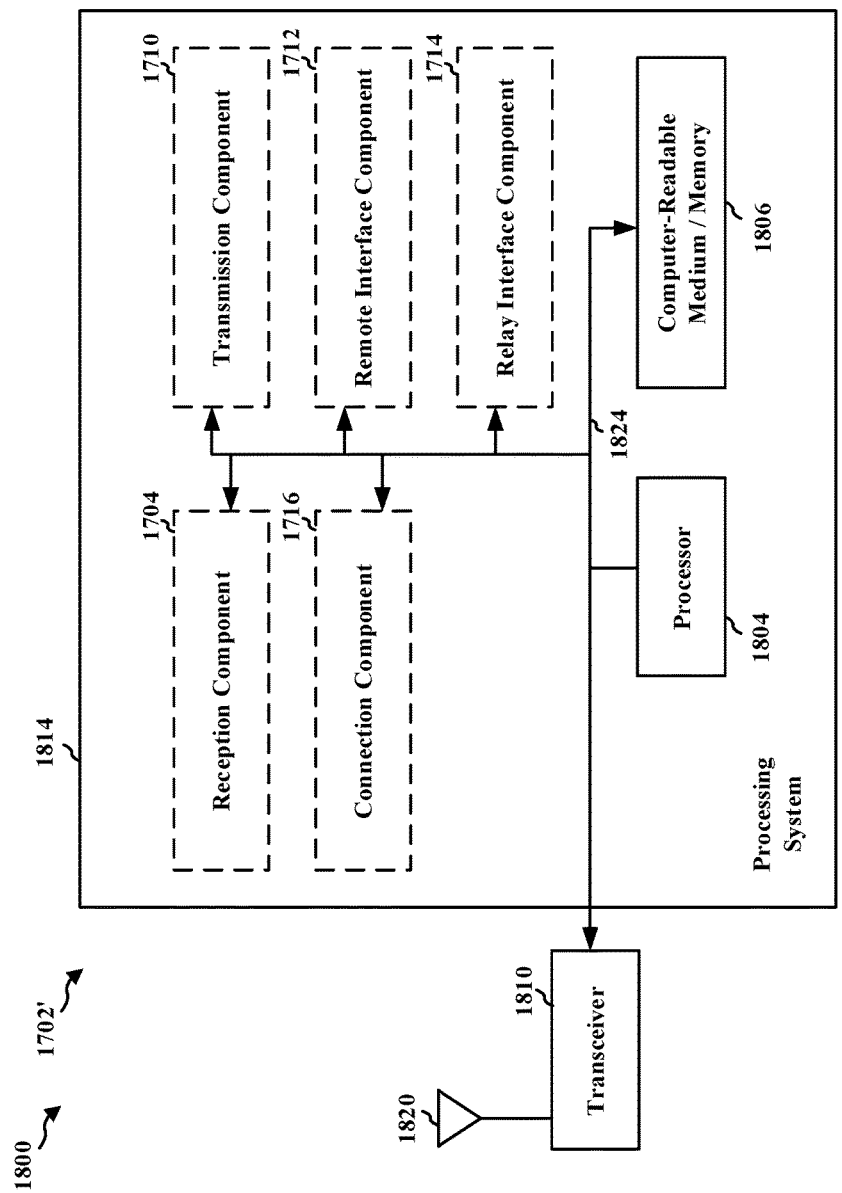
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1710, 1712, 1714, 1716, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1304. In addition, the transceiver 1810 receives information from the processing system 1814, specifically the transmission component 1310, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1710, 1712, 1714, 1716. The components may be software components running in the processor 1804, resident/stored in the computer readable medium/memory 1806, one or more hardware components coupled to the processor 1804, or some combination thereof. The processing system 1814 may be a component of the eNB 310 and may include the memory 376 and/or at least one of the TX processor 316, the RX processor 370, and the controller/processor 375.

In one configuration, the apparatus 1702/1702' for wireless communication includes means for receiving a data transmission from a first UE, the data transmission including a combined packet that includes a first packet associated with the first UE, a second packet from a second UE, a first index of a layer 2 identification (L2-ID) table associated with the first UE, and a second index of a system architecture evolution (SAE) temporary mobile subscriber identity (S-TMSI) table associated with the second UE. The apparatus 1702/1702' further includes means for decoding the first packet using the first index of the L2-ID table for cell ratio temporary identifier (C-RNTI) mapping. The apparatus 1702/1702' further includes means for decoding the second packet using the second index of the S-TMSI table for C-RNTI mapping.

In an aspect, the apparatus 1702/1702' may further include means for transmitting one or more first downlink transmissions to the Uu protocol stack of the first UE. In an aspect, the apparatus 1702/1702' may further include means for transmitting one or more second downlink transmissions to a Uu protocol stack of the second UE.

In an aspect, the apparatus 1702/1702' may further include means for receiving a discovery message from the second UE via the first UE, the discovery message including an attach request and at least one of an international mobile subscriber identity (IMSI) associated with the second UE or a value that distinguishes the second UE from other UEs communicating with the base station via the first UE. In an aspect, the apparatus 1702/1702' may further include means for transmitting a radio resource control (RRC) connection set up message to the second UE, the RRC connection setup message including at least one of a layer 2 identification (L2-ID) or a cell ratio temporary identifier (C-RNTI) associated with a relay link between the first UE and the second UE.

In an aspect, the apparatus 1702/1702' may further include means for receiving a non-access stratum (NAS) attach request from the second UE via the first UE. In an aspect, the apparatus 1702/1702' may further include means for transmitting a NAS authentication request to the second UE.

In an aspect, the apparatus 1702/1702' may further include means for receiving a NAS authentication response from the second UE via the first UE. In an aspect, the apparatus 1702/1702' may further include means for transmitting a security mode command to the second UE. In an aspect, the apparatus 1702/1702' may further include means for receiving a security mode completion message from the second UE via the first UE. In an aspect, the apparatus 1702/1702' may further include means for transmitting a system architecture evolution (SAE) temporary mobile subscriber identity (S-TMSI) to the second UE.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving a packet at a Uu protocol stack of a first user equipment (UE), the packet intended for a base station;
   transferring the packet from the Uu protocol stack of the first UE to a PC5 interface protocol stack of the first UE;
   modifying a header of the packet at the PC5 interface protocol stack to identify the packet as relayed uplink traffic intended for the base station from the first UE; and
   transmitting the packet including the modified header to a second UE for relaying to the base station;
   wherein modifying the header of the packet comprises modifying the header of the packet to include a system architecture evolution (SAE) temporary mobile subscriber identity (S-TMSI).

2. The method of claim 1, further comprising:
   transmitting a discovery message intended for the base station to the second UE, the discovery message including an indication of attach request and at least one of an international mobile subscriber identity (IMSI) associated with the first UE, a value that distinguishes the first UE from other UEs communicating with the base station via the second UE, cell ID, or a layer 2 identification (L2-ID) of the first UE; and
   receiving a response associated with radio resource control (RRC) connection set up message from the base station, the response message including at least one of a cell radio temporary identifier (C-RNTI) or a layer 2 identification (L2-ID) associated with a relay link between the first UE and the second UE.

3. The method of claim 1, further comprising:
   transmitting a non-access stratum (NAS) attach request intended for the base station to the second UE; and
   receiving a NAS authentication request from the base station.

4. The method of claim 3, further comprising:
   transmitting a NAS authentication response intended for the base station to the second UE; and
   receiving a security mode command from the base station.

5. The method of claim 4, further comprising:
   transmitting a security mode completion message intended for the base station to the second UE; and
   receiving the S-TMSI from the base station.

6. A method of wireless communication, comprising:
   receiving a first packet at a PC5 interface protocol stack of a first user equipment (UE) from a second UE, the first packet including a header that identifies the first packet as relayed uplink traffic intended for a base station from the second UE;
   receiving a second packet at a Uu protocol stack of the first UE, the second packet intended for the base station from the first UE;
   transferring the first packet from the PC5 interface protocol stack of the first UE to the Uu protocol stack of the first UE;
   combining the first packet and the second packet to produce a combined packet;
   modifying a header of the combined packet at the Uu protocol stack to identify the first packet as relayed uplink traffic from the second UE and the second packet as local data from the first UE; and
   transmitting the combined packet including the modified header to the base station;
   wherein the modified header includes an index of a system architecture evolution (SAE) temporary mobile subscriber identity (S-TMSI) table associated with the second UE.

7. The method of claim 6, wherein the modified header includes:
   an index of a layer 2 identification (L2-ID) table associated with the first UE.

8. The method of claim 6, further comprising:
   receiving a discovery message intended for the base station from the second UE, the discovery message including an attach request indication and at least one of an international mobile subscriber identity (IMSI) associated with the second UE or a value that distinguishes the second UE from other UEs communicating with the base station via the first UE; and
   transmitting the discover message to the base station.

9. The method of claim 8, further comprising:
receiving a non-access stratum (NAS) attach request intended for the base station from the second UE; and
transmitting the NAS attach request to the base station.

10. The method of claim 9, further comprising:
receiving a NAS authentication response intended for the base station from the second UE; and
transmitting the NAS authentication response to the base station.

11. The method of claim 10, further comprising:
receiving a security mode completion message intended for the base station from the second UE; and
transmitting the security mode completion message to the base station.

12. A method of wireless communication by a base station, comprising:
receiving a data transmission from a first UE, the data transmission including a combined packet that includes a header, the combined packet including a first packet associated with the first UE, a second packet from a second UE, and a first index of a layer 2 identification (L2-ID) table associated with the first UE, wherein the header includes a second index of a system architecture evolution (SAE) temporary mobile subscriber identity (S-TMSI) table associated with the second UE;
decoding the first packet using the first index of the L2-ID table for cell ratio temporary identifier (C-RNTI) mapping; and
decoding the second packet using the second index of the S-TMSI table for C-RNTI mapping;
wherein the first packet was transferred from a Uu protocol stack of the first UE to a PC5 interface protocol stack of the first UE.

13. The method of claim 12, further comprising:
transmitting one or more first downlink transmissions to the Uu protocol stack of the first UE; and
transmitting one or more second downlink transmissions to a Uu protocol stack of the second UE.

14. The method of claim 12, further comprising:
receiving a discovery message from the second UE via the first UE, the discovery message including an attach request and at least one of an international mobile subscriber identity (IMSI) associated with the second UE or a value that distinguishes the second UE from other UEs communicating with the base station via the first UE; and
transmitting a radio resource control (RRC) connection set up message to the second UE, the RRC connection setup message including at least one of a layer 2 identification (L2-ID) or a cell ratio temporary identifier (C-RNTI) associated with a relay link between the first UE and the second UE.

15. The method of claim 14, further comprising:
receiving a non-access stratum (NAS) attach request from the second UE via the first UE; and
transmitting a NAS authentication request to the second UE.

16. The method of claim 15, further comprising:
receiving a NAS authentication response from the second UE via the first UE; and
transmitting a security mode command to the second UE.

17. The method of claim 16, further comprising:
receiving a security mode completion message from the second UE via the first UE; and
transmitting a system architecture evolution (SAE) temporary mobile subscriber identity (S-TMSI) to the second UE.

18. An apparatus for wireless communication, comprising:
means for receiving a packet at a Uu protocol stack of a first user equipment (UE), the packet intended for a base station;
means for transferring the packet from the Uu protocol stack of the first UE to a PC5 interface protocol stack of the first UE;
means for modifying a header of the packet at the PC5 interface protocol stack to identify the packet as relayed uplink traffic intended for the base station from the first UE; and
means for transmitting the packet including the modified header to a second UE for relaying to the base station;
wherein the means for modifying the header of the packet is configured to modify the header of the packet to include a system architecture evolution (SAE) temporary mobile subscriber identity (S-TMSI).

19. The apparatus of claim 18, further comprising:
means for transmitting a discovery message intended for the base station to the second UE, the discovery message including an indication of attach request and at least one of an international mobile subscriber identity (IMSI) associated with the first UE, a value that distinguishes the first UE from other UEs communicating with the base station via the second UE, cell ID, or a layer 2 identification (L2-ID) of the first UE; and
means for receiving a response associated with radio resource control (RRC) connection set up message from the base station, the response message including at least one of a cell radio temporary identifier (C-RNTI) or a layer 2 identification (L2-ID) associated with a relay link between the first UE and the second UE.

20. The apparatus of claim 18, further comprising:
means for transmitting a non-access stratum (NAS) attach request intended for the base station to the second UE; and
means for receiving a NAS authentication request from the base station.

21. The apparatus of claim 20, further comprising:
means for transmitting a NAS authentication response intended for the base station to the second UE; and
means for receiving a security mode command from the base station.

22. The apparatus of claim 21, further comprising:
means for transmitting a security mode completion message intended for the base station to the second UE; and
means for receiving the S-TMSI from the base station.

* * * * *